United States Patent
Madraswala et al.

(10) Patent No.: US 12,468,484 B2
(45) Date of Patent: *Nov. 11, 2025

(54) EXPRESS STATUS OPERATION FOR STORAGE DEVICES WITH INDEPENDENT PLANES AND PLANE GROUPS

(71) Applicant: Intel NDTM US LLC, Santa Clara, CA (US)

(72) Inventors: Aliasgar S. Madraswala, Folsom, CA (US); Naveen Prabhu Vittal Prabhu, Folsom, CA (US); Vinaya Harish, Sunnyvale, CA (US); Sanket Sanjay Wadyalkar, Folsom, CA (US)

(73) Assignee: INTEL NDTM US LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,619

(22) Filed: Mar. 23, 2023

(65) Prior Publication Data

US 2023/0229356 A1 Jul. 20, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/064; G06F 3/061

See application file for complete search history.

(56) References Cited

U.S. PATENT DOCUMENTS

| | | | |
|---|---|---|---|
| 2014/0013012 A1* | 1/2014 | Terlizzi | G06F 13/38 710/15 |
| 2019/0042130 A1* | 2/2019 | Vittal Prabhu | G11C 11/5642 |
| 2019/0227749 A1* | 7/2019 | Wakchaure | G06F 3/0604 |
| 2021/0389895 A1* | 12/2021 | Pekny | G06F 3/0659 |
| 2022/0238145 A1* | 7/2022 | Rao | G11C 7/1078 |
| 2022/0310174 A1* | 9/2022 | Deng | G11C 7/08 |
| 2023/0138471 A1* | 5/2023 | Ngo | G11C 16/10 365/185.17 |
| 2023/0229350 A1* | 7/2023 | Madraswala | G06F 3/0656 711/102 |
| 2023/0376215 A1* | 11/2023 | Madraswala | G06F 3/064 |
| 2024/0069808 A1* | 2/2024 | Bukhari | G06F 3/0659 |
| 2024/0086107 A1* | 3/2024 | Nayak | G06F 3/0679 |

* cited by examiner

*Primary Examiner* — Zhuo H Li
(74) *Attorney, Agent, or Firm* — Morgan, Lewis & Bockius LLP

(57) ABSTRACT

A storage device includes a storage array with multiple planes organized as plane groups, where the planes of a plane group receive and process commands in parallel. The storage device includes a storage controller that receives a command from a host controller. In response to receipt of the command the storage controller provides ready information for all planes to the host controller. The multiple planes can optionally have independent multiplane read operation (IMPRO). Each plane group can have a first plane and a second plane, and the storage controller can optionally read data from the first plane of a plane group in response to a virtual ready signal for the first plane, before the second plane of the plane group is ready.

20 Claims, 12 Drawing Sheets

| 402 | | | CMD_73h |
|---|---|---|---|
| | STATUS BIT | DESCRIPTION | COMMENTS |
| 412 | SR7 | RESERVED | RESERVED |
| 414 | SR6 | RESERVED | RESERVED |
| 416 | SR5 | VIRT_RDY_P5 | VIRTUAL RDY FOR PLANE 5 |
| 418 | SR4 | VIRT_RDY_P4 | VIRTUAL RDY FOR PLANE 4 |
| 420 | SR3 | VIRT_RDY_P3 | VIRTUAL RDY FOR PLANE 3 |
| 422 | SR2 | VIRT_RDY_P2 | VIRTUAL RDY FOR PLANE 2 |
| 424 | SR1 | VIRT_RDY_P1 | VIRTUAL RDY FOR PLANE 1 |
| 426 | SR0 | VIRT_RDY_P0 | VIRTUAL RDY FOR PLANE 0 |

| | STATUS BIT | DESCRIPTION | COMMENTS |
|---|---|---|---|
| 512 | SR7_Px | RESERVED | RESERVED |
| 514 | SR6_Px | RDY_PGx | PER PLANE GROUP |
| 516 | SR5_Px | ARDY_PGx | PER PLANE GROUP |
| 518 | SR4_Px | PERESET/WP# | PER LUN |
| 520 | SR3_Px | THERMAL ALERT | PER PLANE GROUP |
| 522 | SR2_Px | RESERVED | RESERVED |
| 524 | SR1_Px | VIRT_RDY_PG_MSB | VIRTUAL RDY FOR HIGHER PLANE WITHIN PLANE GROUP |
| 526 | SR0_Px | VIRT_RDY_PG_LSB | VIRTUAL RDY FOR LOWER PLANE WITHIN PLANE GROUP |

502     CMD_72h

EXPRESS STATUS OPERATION FOR STORAGE DEVICES WITH INDEPENDENT PLANES AND PLANE GROUPS

TECHNICAL FIELD

Descriptions are generally related to storage devices, and more particular descriptions are related to storage devices with planes and plane groups.

BACKGROUND OF THE INVENTION

Nonvolatile memory such as NAND flash memory is commonly used in storage device. Increased nonvolatile densities allow a storage array to be separately addressed as different portions, referred to as planes. Planes of storage can independently and concurrently process operations with independent multiplane read operation (IMPRO). With independent operation, a host accesses each plane with separate status read commands to monitor the progress of read operations.

Planes can operate in plane groups. With independent plane operation, the host can read the planes concurrently, but delays readout until all planes within the plane group have completed the read operation. Thus, if a plane group includes different page types (e.g., single level cell (SLC) and quad level cell (QLC)), the host will wait until the slowest read operation is completed before performing the readout.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
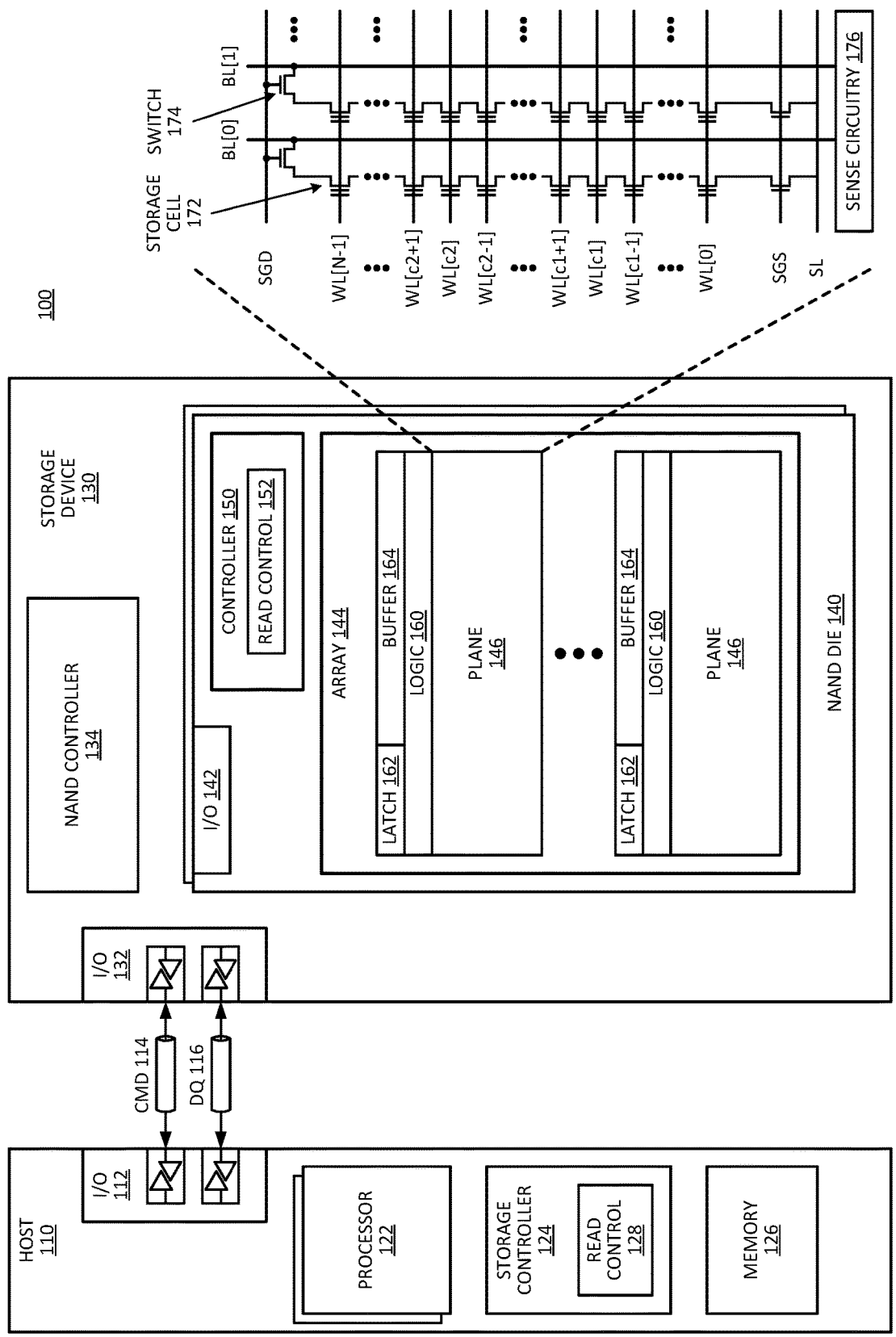
FIG. 1 is a block diagram of an example of a system with a multiplane storage device.

Descriptions of certain details and implementations follow, including non-limiting descriptions of the figures, which may depict some or all examples, and well as other potential implementations.

DETAILED DESCRIPTION OF THE INVENTION

As described herein, a storage device includes a storage array with multiple planes organized as plane groups, where the planes of a plane group receive and process commands in parallel. The storage device includes a storage controller that receives a command from a host controller. In response to receipt of the command the storage controller provides ready information for all planes to the host controller. The multiple planes can optionally have independent multiplane read operation (IMPRO). Each plane group can have a first plane and a second plane, and the storage controller can optionally read data from the first plane of a plane group in response to a virtual ready signal for the first plane, before the second plane of the plane group is ready.

Both the reading of the ready information from all planes and the readout of one plane of a plane group before another plane in the plane group is ready can be referred to as express operations. More specifically, the reading of ready information for all planes can be referred to as a turbo status read operation for an IMPRO system. The readout of one plane before another plane in the same group is ready can be referred to an early readout operation.

As part of IMPRO and express IMPRO (eIMPRO) operations, the host can queue read operations across all planes concurrently. Furthermore, planes can have different page types, even within the same plane group. The different page types can include single level cell (SLC) and any variety of multilevel cell, including two level cell (often referred as multilevel cell (MLC)), triple level cell (TLC), quad level cell (QLC), or other multiple level. The page type can include an MLC operating in SLC on the fly (OTF) mode, where the plane temporarily operates in SLC mode.

A command usually includes a command plus an address (CMD+ADDR) issued from the host to the nonvolatile media (NVM). A command can have an associated delay on the order of 25 ns+80 ns for the CMD delay (tWC) and the ADDR delay (tWHR), respectively. The delay can have a significant impact on read performance to read status separately for each plane. A turbo status read command that reads the ready status for all planes with one command can thus reduce the polling overhead for a channel, by eliminating the need to read each plane group multiple times.

With a turbo status read, the host can monitor ready (RDY) for each plane of the logical unit (LUN) with just one status read command, which eliminates the need for separate read status per plane group. The storage die (e.g., NAND die) sets the RDY for the planes that have completed the read operation. The host can poll using turbo status to track the readiness of each plane. Once the plane is RDY, the host can read out the data while continuing to monitor the status of other planes using one status read command.

The ready status provided by the turbo status read can be virtual ready (VRDY). A nonvolatile memory can have multiple ready states. Array ready (ARDY) can refer to a completion of a read and all finishing operations by the media, which means the storage medium is ready to process another access request. Ready (RDY) can refer to a ready state in which the array has transferred data contents to a read buffer to enable the host to access the contents from the buffer while the media performs the operations necessary for the array to be ready for a subsequent access request (e.g., getting to ARDY). Virtual ready (VRDY or VIRT_RDY) can refer to a ready state in which one plane of a plane group has completed its read operation or a plane of a plane group has completed the operation of the read levels and moved data into a buffer. Thus, VIRT_RDY can be comparable to RDY, as applied to a single plane of a plane group, without reference to whether other planes of the plane group have reached RDY (or VIRT_RDY) state.

Early readout can apply to any system that has multiple planes and plane groups. The system can have IMPRO operation or other configuration. The early read allows different page types to be read on each plane concurrently within a plane group without being limited to the slowest plane in the plane group. Readout from a fastest plane (short tR) can occur as soon as the plane is ready, instead of waiting for the latency of the slowest plane (longest tR) within the plane group.

The early readout can be referred to as a proactive readout, which enables the host to proactively read out the faster plane(s) within a plane group, while the slower plane(s) continue with the read operation. In one example, the storage die provides Virtual RDY information for the planes within the plane group using a status register. The host can track the status of each plane by polling the status register, and start reading out data as soon as VIRT_RDY is asserted for a particular plane.

FIG. 1 is a block diagram of an example of a system with a multiplane storage device. System 100 includes host 110, which represents the host system to which storage device 130 is connected. Storage device 130 provides a storage resource to store data for host 110.

Host 110 includes processor 122, storage controller 124, and memory 126. Processor 122 represents a host processor or computing device for host 110. Processor 122 can be a single core device or a multicore device. Storage controller 124 represents a controller in host 110 that manages access to storage device 130. Storage controller 124 can perform scheduling and manage timing and data transfer with storage device 130.

In one example, storage controller 124 manages polling of ready status for different planes and plane groups of storage device 130. In one example, storage controller 124 can issue a Turbo Status Read command to storage device 130 to access ready status information for all planes of the storage device. In one example, storage controller 124 can issue an Early Read command to access data from one plane of a plane group even if other plane(s) of the group are not ready to read.

Memory 126 represents operational memory in host 110. The operational memory is typically volatile memory, which has indeterminate state if power is interrupted to the memory. The operational memory could alternatively be nonvolatile memory, which has determinate state even when power is interrupted to the memory. Memory 126 generally holds data and code for use by processor 122. Data read from storage device 130 is typically stored in memory 126 for use by processor 122.

Host 110 includes input/output (I/O) 112, which represents hardware to interface with an external device, such as storage device 130, which can represent a peripheral device. I/O 132 represents hardware of storage device 130 to interface with host 110 through I/O 112. In one example, the interconnection between I/O 112 and I/O 132 can include a command connection or command link or command bus, as represented by CMD 114. The link/bus can be signal lines over which host 110 sends commands to storage device 130. The interconnection can include a data bus represented by DQ 116.

Storage device 130 includes NAND controller 134, which represents a controller on the storage device to manage the nonvolatile memory (NVM) resources. As illustrated, storage device 130 includes multiple NAND dies 140. In one example, NAND dies 140 include array 144 having QLC media that can operate in SLC OTF mode.

NAND dies 140 include I/O 142, which represents interconnection hardware to connect to I/O 132. Controller 150 represents control logic on NAND die 140 to manage access to the different planes of array 144. Planes 146 represent separate portions of array 144. Planes 146 refer to portions of array 144 that can be separately addressed and accessed. In one example, planes 146 have IMPRO operation. In one example, array 144 includes 4 planes, 6 planes, or some other number of planes. In one example, array 144 represents an array of three dimensional (3D) NAND, which refers to NAND created in a vertical stack, with a vertical channel as opposed to a traditional horizontal channel.

In one example, planes 146 include logic 160, such as column and row decoding/encoding logic to access the storage cells of the plane to execute a read or write operation. Latch 162 represents a latch to store ready information. Thus, latch 162 can indicate ready or virtual ready information when data from the plane is ready for access. In one example, latch 162 represents VRDY information for each plane 146.

In one example, in response to completion of a read operation (e.g., detecting the stored data based on the read levels applied), the plane trigger latch 162. In response to latch 162, NAND controller 134 can update a ready status register (register not specifically shown) with ready status information for the plane.

Buffer 164 represents a temporary storage for data read from plane 146. In response to a read command, plane 146 will access the array (e.g., the portion of array 144 that is in plane 146) and place the data in buffer 164. Host 110 can access the data from buffer 164 while the array continues to perform operations related to the read.

In one example, each NAND die 140 includes controller 150 with read control 152. Read control 152 can represent control logic within controller 150 of storage device 130 to enable controller 150 to manage status information in response to a turbo status read command. Read control 152 can represent control logic within controller 150 of storage device 130 to enable controller 150 to manage read data for an early read for selected planes of a plane group.

In one example, storage controller 124 includes read control 128, which represents logic on the host side to manage the generating and sending of a status commands, which can include a turbo status read. Read control 128 can enable storage controller 124 to perform an early access to data for one plane of a plane group that is ready for a read before other planes of the plane group. More specifically, use a turbo status read command can allow the use of one status command instead of multiple status commands.

When a turbo status read command or early read command are sent from storage controller 124 to storage device 130, CMD 114 will show the encoding of the command. In response to the command, DQ 116 will show data responsive to the specific command, where the timing between the command and the data patterns can indicate what data is sent.

In one example, plane 146 is a portion of a 3D NAND array. System 100 illustrates an example of a 3D stacked memory device. In one example, storage cells 172 represent NAND storage cells for a NAND device. In one example, storage cells 172 represent charge trap cells, which traps (stores) a layer of charge between the gate and the channel. In one example, storage cells 172 represent floating gate cells with floating gate structures that store charge. Other architectures are also possible. The stored charge is indicative of one or more bit values.

Based on the different levels of charge stored and detectable within a cell, the cells can be programmed according to various encoding schemes such as SLC (single level cell), MLC (multi-level cell), TLC (triple level cell), QLC (quad level cell), or other encoding scheme. Each cell's threshold voltage (Vt) is indicative of the data that is stored in the cell.

The array includes N wordlines (WL[0] to WL[N−1]). Access to the columns, pillars or strings of storage cells 172 can be addressed by row (wordline or WL) address and column (bitline or BL) address, and gated with control gate signals. In one example, the array is organized as multiple subblocks of cells, which is not explicitly shown.

The array includes multiple vertical stacks, with a stack corresponding to each bitline (e.g., BL[0], BL[1], . . . ). The vertical stack includes a vertical channel passing through the various wordlines, with the channel controlled by control gate signals. The control gate signals can be referred to as switching signals that provide gating control for a channel. For example, the various pillars can be controlled by select gate drain (SGD) signal lines and select gate source (SGS) signal lines. The SGD and SGS signals are gated by switches 174. An SGD signal line selectively couples a column to a bitline (BL). An SGS signal line selectively couples a column to a source line (SL). The source line (SL) can be a source layer of material integrated onto a semiconductor substrate.

The array includes M bitlines (BL[0] to BL[M−1]). In one example, each storage cell 172 within plane 146 is addressed or selected by asserting a wordline and a bitline, in conjunction with enabling the column with the gate select switches 174 (labeled only on SGD, but SGS switches can be considered included in the control). The wordlines span across multiple series strings of memory devices. Sense circuitry 176 detects the state of memory cells by sensing voltage or current on a selected bitline.

Figure 2:
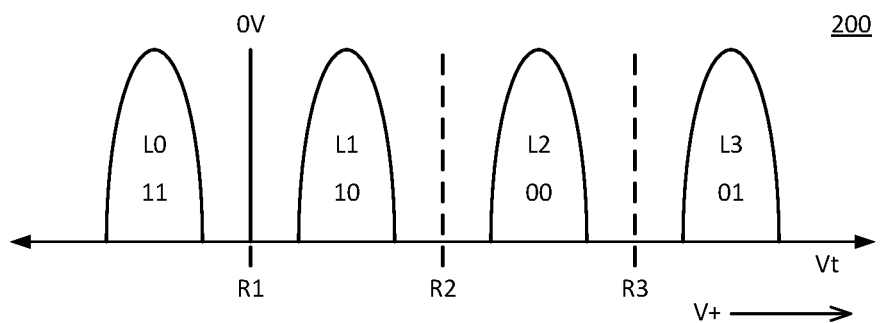
FIG. 2 is a representation of read nonvolatile memory read levels.

FIG. 2 is a representation of nonvolatile memory read levels. More specifically, diagram 200 illustrates four read states for an MLC (two-level) NAND device, which can be a device with two-level cells. With two-level cells, the cells can store one of four states: 11, 10, 00, and 01. Diagram 200 illustrates level 0 (L0) corresponding to an erase state of 11, level 1 (L1) corresponding to a first program level of 10, level 2 (L2) corresponding to a second program level of 00, and level 3 (L3) corresponding to a program level of 01.

In one example, a cell state that is set to store multiple bits can form a part of multiple different pages, with each bit of the cell corresponding to a distinct page. For example, for a cell that is to enter a state to store 2 bits (e.g., using MLC encoding), one bit can correspond to an Upper Page (UP) and the other bit to a Lower Page (LP). For a cell that is to enter a state to store 3 bits (e.g., using TLC encoding), one bit can correspond to an LP, one bit to a UP, and the other bit to an Extra Page (XP). For a cell that is to store 4 bits (e.g., using QLC encoding), one bit can correspond to an LP, another bit to a UP, another bit to an XP, and the final bit to a Top Page (TP). Each page (e.g., LP, UP, XP, TP) can include an aggregation of corresponding bits stored by a plurality of different cells of a wordline. The different bits can have different labels in different systems.

A programming sequence for a group of cells can include programming the intended pages into the group of cells. A programming sequence can include one or more programming passes, where a programming pass programs one or more pages. A programming pass can include one or more programming loops. A programming pass generally includes the application of one or more effective program voltages to cells to be programmed followed by the application of one or more verify voltages to the cells to determine which cells have finished programming. The system can be configured to skip a program voltage or a verify voltage, or skip both a program voltage and one or more verify voltages, for cells that have already passed program verify. The application of an effective program voltage to a cell can include changing the voltage difference between a control gate and a channel of the cell to change the Vt of the cell. Accordingly, the controller can apply a voltage to a wordline (coupled to the control gate of the target cell) and/or to a channel of the cell to set an effective program voltage.

Figure 3:
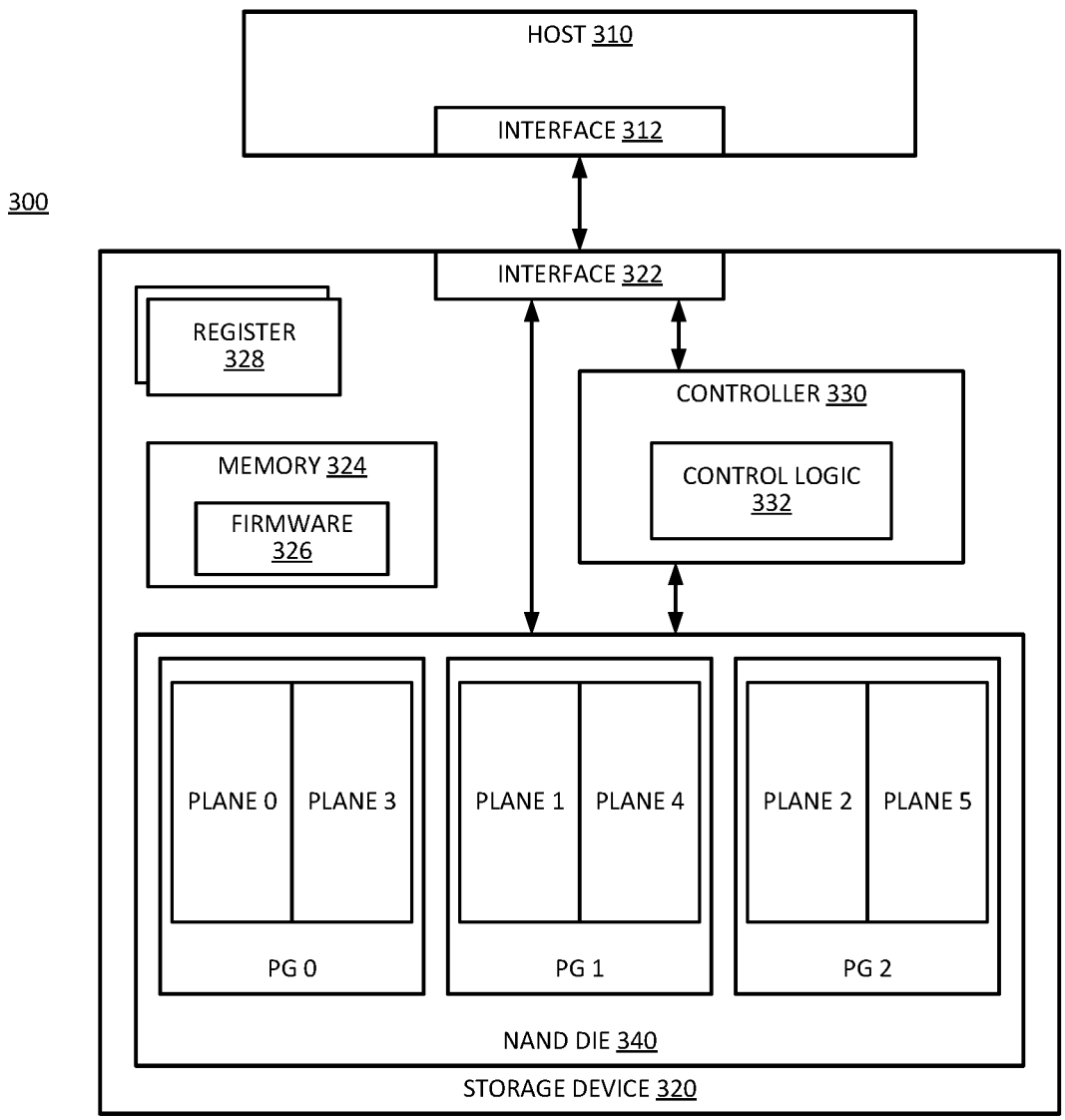
FIG. 3 is a block diagram of an example of a system with planes in plane groups with express operation.

FIG. 3 is a block diagram of an example of a system with planes in plane groups with express operation. System 300 provides an example of a system in accordance with an example of system 100. System 300 includes host 310 coupled to storage device 320.

Storage device 320 includes a memory medium for storing data, represented by NAND die 340. NAND die 340 can be organized as multiple planes in plane groups. As illustrated, NAND die 340 includes 6 planes in 3 plane groups. While the specific organization can vary by implementation, system 300 illustrates plane group PG 0 having Plane 0 and Plane 3, PG 1 having Plane 1 and Plane 4, and PG 2 having Plane 2 and Plane 5. Thus, as illustrated each plane group has a first plane and a second plane. Other implementations can have more planes per plane group.

Planes in a plane group have at least certain operations tied together, such as executing the same command. Thus, planes within a plane group can receive and process commands in parallel. NAND die 340 can represent multiple dies in storage device 320.

Storage device 320 is communicatively coupled with host 310 through a link formed between interface 312 of host 310 and interface 322 of storage device 320. In one example, interface 312 is a part of a peripheral control hub (PCH). In one example, interface 312 is part of a root complex. In one example, the link between the interface is compliant with a communication standard such as PCI Express (PCIe), serial advanced technology attachment (ATA), parallel ATA, universal serial bus (USB), or other interface protocol.

Storage device 320 includes one or more registers 328. Register 328 can include registers to store configuration information that controls the mode of operation of storage device 320. Register 328 can include a register to store ready information for the planes of NAND die 340. Register 328 can include a status register. In one example, the register with ready information can be within NAND die 340. In such a case where the ready information register is within NAND die 340, controller 330 can read and provide the register information to host 310.

In one example, storage device 320 includes memory 324, which can represent volatile operating memory or nonvolatile memory that stores code for execution by controller 330. Firmware 326 represents code to manage the operation of storage device 320, which can be executed by controller 330.

System 300 does not explicitly illustrate the storage controller of host 310. Host 310 includes a storage controller to manage the sending of commands from the host side to storage device 320. Controller 330 represents a controller on storage device 320 to receive and process commands from the host. Controller 330 can generate internal operations in response to command from host 310 to execute the commands. In one example, controller 330 is an application specific integrated circuit (ASIC). In one example, controller 330 is a microcontroller or microprocessor.

Control logic 332 represents control logic of controller 330 that enables the controller to control access to NAND die 340. Controller 330 can manage read operations, write operations, erase operations, and status requests from host 310 (e.g., from the storage controller on the host).

In one example, control logic 332 is software/firmware, such as firmware 326. In one example, control logic 332 represent hardware logic circuitry, such as one or more state machine logic circuits, programmable logic circuitry (e.g., field programmable gate array (FPGA), programmable logic array (PLA)), or a combination of hardware circuitry and software/firmware.

NAND die 340 can be organized as blocks of cells, where a block is the smallest erasable unity of the array. Some NAND storage devices have a single state machine for the entire NAND die, limiting read operations to one plane at a time, where one plane executes an operation and the other planes are idle. Multiplane operation (e.g., IMPRO devices) allows independent execution of operations on multiple planes in parallel/concurrently. To support IMPRO, controller 330 can include separate state machines for the different planes.

In one example, NAND die 340 includes independent operation across plane groups. Planes within the plane groups can be restricted to performing the same array operation, such as programming data to the array, reading data from the array, erasing a block, or other operations on the array. For example, PG 0 could perform a different array operation from PG 1. Within PG 0, Plane 0 and Plane 3 can both perform the same array operation.

With early read, reads from planes within a plane group can occur with different timings, based on a plane triggering a ready signal. With the use of different ready signal timing, planes within a plane group can provide read data from the same read command on different timings. With early read, host 310 (e.g., through controller 330) can read data from one of the planes of a plane group before the other plane is ready to read. In one example, host 310 can send a status command and receive information for all planes in NAND die 340, enabling the host to know the status for all planes without needing to poll the planes separately.

Figures 4A, 4B:
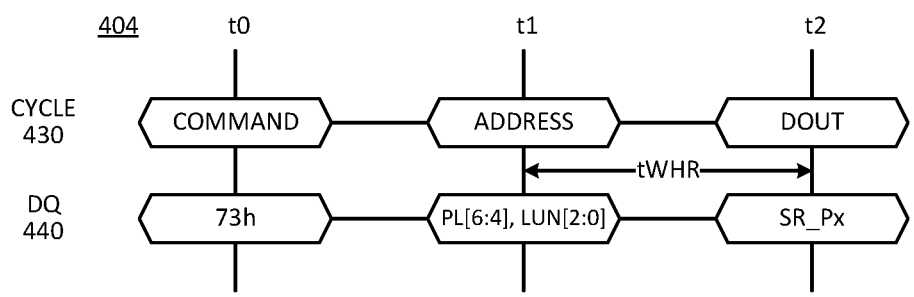
FIGS. 4A-4B provide a representation of a turbo status read command operation.

FIGS. 4A-4B provide a representation of a turbo status read command operation.

Referring to FIG. 4A, table 402 represents a ready status table to be stored in a register of a storage device having multiple planes. The multiple planes support IMPRO operation. Table 402 assumes the use of 6 planes. It will be understood that a storage device with a different number of planes can have a different structure. In practice, table 402 can have a number of bits to indicate the status of the planes as interpreted in accordance with table 402. In one example, as indicated in the diagram, a register can have eight bits.

Table 402 includes three columns: status bit, description, and comments. The status bit column can indicate the bits of status information. The description column provides a label for the status bit of the first column. The comments more explicitly describe the interpretation of the bits. In one example, table 402 represents status information for a command CMD_73h, referring to a command with a hex code '73'. It will be understood that the command code can be different for different communication/interface protocols.

Row 412 for SR7 and row 414 for SR6 can be reserved for a device containing 6 rather than 8 planes. Row 416 indicates SR5 as VIRT_RDY_5, the virtual ready signal for plane 5. Row 418 indicates SR4 as VIRT_RDY_4, the virtual ready signal for plane 4. Row 420 indicates SR3 as VIRT_RDY_3, the virtual ready signal for plane 3. Row 422 indicates SR2 as VIRT_RDY_2, the virtual ready signal for plane 2. Row 424 indicates SR1 as VIRT_RDY_1, the virtual ready signal for plane 1. Row 426 indicates SR0 as VIRT_RDY_0, the virtual ready signal for plane 0.

Table 402 indicates virtual read information for each plane. The NAND die can update the ready (RDY) status per plane once the read operation is completed for a respective plane. With the turbo status read command, the NAND can latch the RDY status of each plane in a unique status bit.

In one example, table 402 includes more bits, with bits sufficient to indicate one or more pieces of information in addition to virtual ready information. For example, the storage die could accommodate other useful information such as array ready (ARDY), power reset (PERESET), thermal alert, or other information.

Whereas RDY indicates when data for a read operation is ready to access, ARDY is longer than RDY, indicating when the array itself is ready to process another command. Thus, ARDY indicates the end of the array operation and the array cleanup operations. PERESET can provide information related to handling a low power situation that occurs during execution of an array operation.

Referring to FIG. 4B, diagram 404 illustrates a command sequencing for a command to receive the status information of table 402. During an eIMPRO operation, the host can queue different page types to be read in each plane concurrently. In addition, some planes or plane groups can be in OTF SLC mode. Thus, some planes will finish the read operation faster than others. In the legacy IMPRO status commands, the status data is restricted to a specific plane or plane group. As such, in legacy systems, the host can only obtain status information for all planes by issuing read status commands on each plane or plane group separately to monitor the status of the read operation.

In diagram 404, the host issues a turbo status read, which is indicated with a command encoding of 73h. Cycle 430 represents a description of command sequencing, with a command at t0 followed by address information at t1 and data out (DOUT) at t2. DQ 440 represents a description of possible values corresponding to the command sequencing of cycle 430. Again, at t0, the turbo status read command is indicated by the command encoding of 73h. At t1, the address information can indicate a target for the command. In one example, the bits of the address information can include plane information (PL) at bits 6:4, and logical unit number (LUN) at bits 2:0.

The full command can be considered the command plus the address information. After a delay from the command, the storage device can provide status information in response to the status command. Thus, diagram 404 illustrates a delay of tWHR between t1 and t2, where tWHR is the time for the storage device to respond to the command. SR_Px at time t2 represents the status register (SR) plane information. In one example, each device includes a flip-flop to enable the planes to store ready information, enabling the device to send all status data at one time to the host. The storage controller can read the flip-flop of each plane and write the ready status information to a register accessible to the host.

In one implementation, the total time for a status command, from sending the command to receiving the status, is approximately 105 ns. Accessing status information for all planes with a single command can reduce the status polling overhead, which would otherwise need to be repeated for each plane/plane group to be polled. The host can use the turbo status command to monitor the "RDY" status of all plane/plane groups within the selected LUN with one status read operation. In one example, the host can queue up data readout on planes that have "RDY" asserted.

Figures 5A, 5B:
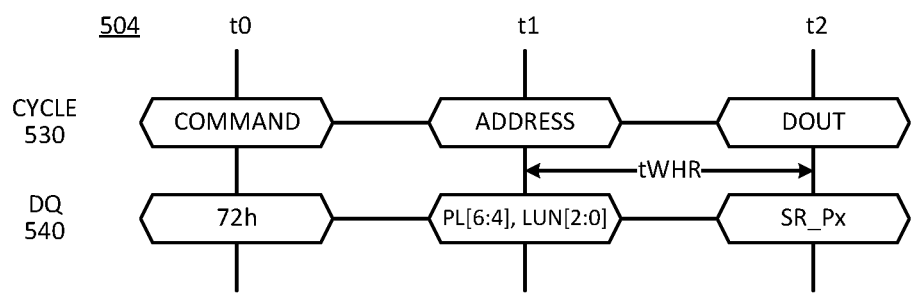
FIGS. 5A-5B provide a representation of an early read access command operation.

FIGS. 5A-5B provide a representation of an early read access command operation.

Referring to FIG. 5A, table 502 represents a table of status information to be stored in a register of a storage device having multiple planes. In one example, the multiple planes support IMPRO operation. In one example, the multiple planes do not have IMPRO operation. In practice, table 502 can have a number of bits to indicate the status information needed for the planes/plane groups. In one example, as indicated in table 502, a register can have eight bits with information to be interpreted in accordance with the layout shown.

Table 502 includes three columns: status bit, description, and comments. The status bit column can indicate the bits of status information. The description column provides a label for the status bit of the first column. The comments more explicitly describe the interpretation of the bits. In one example, table 502 represents status information for a command CMD_72h, referring to a command with a hex code '72'. It will be understood that the command code can be different for different communication/interface protocols.

Whereas the command described with reference to table 402 provides status information for all planes, table 502 represents a table for a command that is issued per plane or per plane group, depending on the implementation. As such, the status bits for table 502 indicate "_Px", referring to different information per plane/plane group that the table applies to.

Row 512 for SR7_Px and row 522 for SR2_Px can be reserved for information not indicated in table 502. Row 514 indicates SR6_Px as RDY_PGx, the read/data ready signal for a plane group. Row 516 indicates SR5_Px as ARDY_PGx, the array ready signal for a plane group. Row 518 indicates SR4_Px as PERESET/WP #, the power reset signal for a LUN/device. Row 520 indicates SR3_Px as THERMAL ALERT, the signal to indicate that a plane group has reached a thermal threshold. Row 524 indicates SR1_Px as VIRT_RDY_PG_MSB, the virtual ready signal for the higher plane within a plane group, assuming two planes per plane group. Row 526 indicates SR0_Px as VIRT_RDY_PG_LSB, the virtual ready signal for the lower plane within a plane group, assuming two planes per plane group.

Referring to FIG. 5B, diagram 504 illustrates a command sequencing for a command to receive the status information of table 502. In diagram 504, the host issues a status read, which is indicated with a command encoding of 72h. Cycle 530 represents a description of command sequencing, with a command at t0 followed by address information at t1 and data out (DOUT) at t2. DQ 540 represents a description of possible values corresponding to the command sequencing of cycle 530. Again, at t0, the status read command is indicated by the command encoding of 72h. At t1, the address information can indicate a target for the command. In one example, the bits of the address information can include plane information (PL) at bits 6:4, and logical unit number (LUN) at bits 2:0.

The full command can be considered the command plus the address information. After a delay from the command, the storage device can provide status information in response to the status command. Thus, diagram 504 illustrates a delay of tWHR between t1 and t2. SR_Px at time t2 represents the status register (SR) plane information. In one example, the virtual ready information for the plane informs the host separately about the read/data status for the separate planes of the plane group.

With the indication of the virtual ready information, the host can access one plane of the plane group before the other plane in the same plane group is ready for a read. Thus, the host can read from one of the planes while the other plane completes the read operation. In a legacy system, the ready information is limited to the per plane group RDY, which limits reading a data until the last plane has finished executing the read. With the CMD_72h illustrated, the host can read data from selected planes of a plane group without waiting for the other plane(s) of the plane group.

Figure 6:
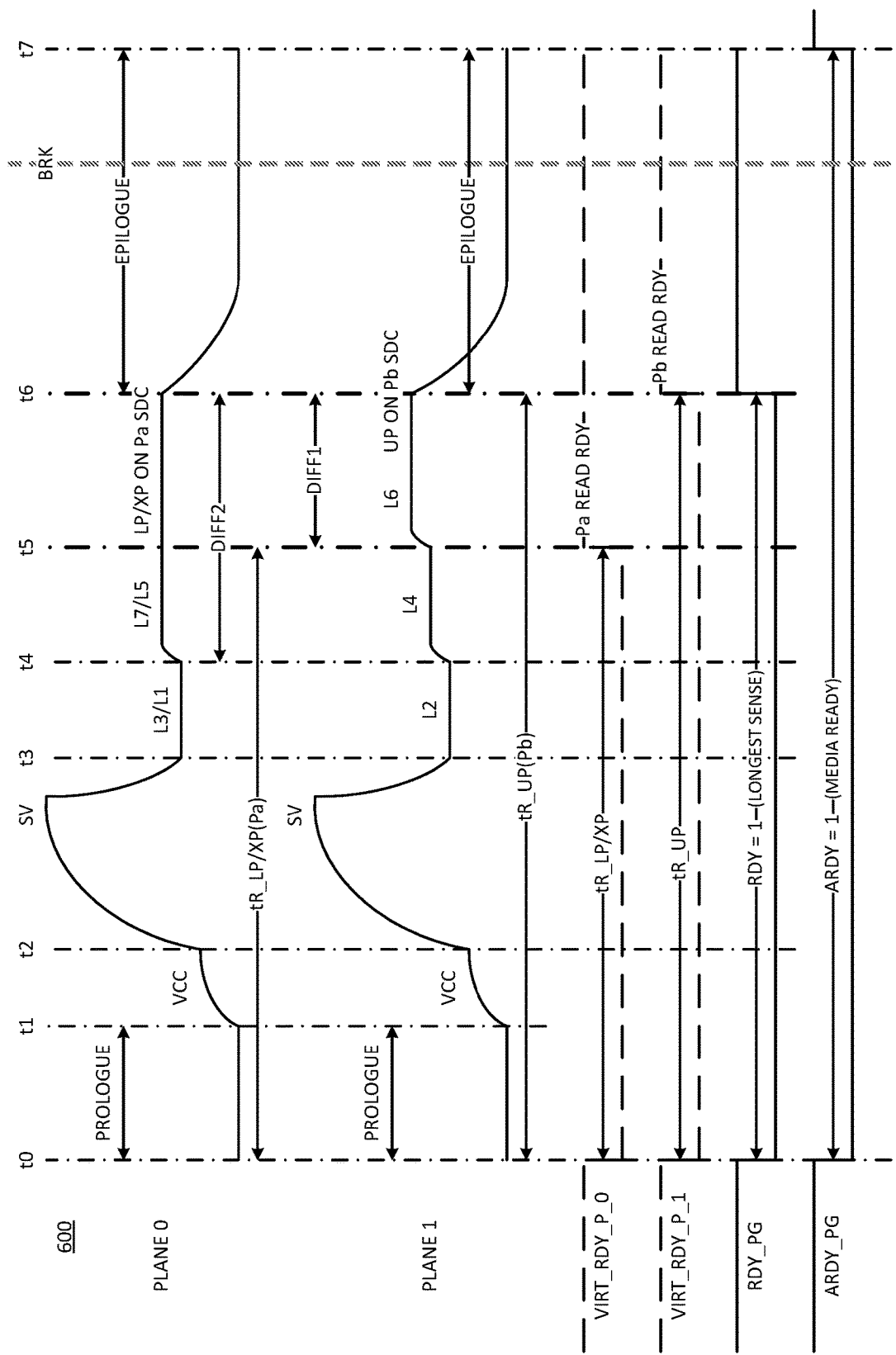
FIG. 6 is a representation of early read access operation.

FIG. 6 is a representation of early read access operation. Diagram 600 represents a timing diagram for a read operation of a system in accordance with an example of system 100 or system 300. It will be understood that the timing indicators, t0, t1, t2, t3, t4, t5, t6, t7, and t8 do not necessarily have a uniform amount of time between adjacent timing indicators.

Consider first the signals at the bottom of the diagram. The four signals represented are VIRT_RDY_P_0, VIRT_RDY_P_1, RDY_PG, and ARDY_PG. VIRT_RDY_P_0 represents the virtual ready signal for Plane 0 of the plane group. VIRT_RDY_P_1 represents the virtual ready signal for Plane 1 of the plane group. RDY_PG represents the ready signal for the plane group. ARDY_PG represents the array ready signal for the plane group. At the top of the diagram is a curve representing the read operation for Plane 0. Under the curve for Plane 0 is the curve representing the read operation for Plane 1.

During an eIMPRO operation, the page types can be different across the planes within the plane group. In legacy systems, the readout for any plane is gated by completion of IMPRO operations on all planes within the plane group. Diagram 600 illustrates a system that allows readout for a plane when it is ready, even if the other plane(s) in the plane group are not ready.

In response to a read operation, the system can de-assert VIRT_RDY_P_0, VIRT_RDY_P_1, RDY_PG, and ARDY_PG. In the read operation curves, time t0 to t1 is a prologue period for the read operation. At time t1, the system can apply VCC. At time t2, the system can apply a read voltage, which can ramp up to a select voltage level 'SV' with the application of the program voltage, after which the voltage will ramp down once the read voltage.

NAND reads include application of the select voltage, followed by read steps. Consider that Plane 0 completes the read operation faster than Plane 1. At time t3, Plane 0 applies read levels L1 and L3 for the LP and XP pages, respectively.

Plane 1 applies read level L2 for the UP. At time t4, Plane 0 can apply L7/L5 for XP/LP, respectively, and Plane 1 can apply L4 for UP.

Consider that after application of L7/L5, Plane 0 has completed the read operation. Thus, the NAND controller can assert VIRT_RDY_P_0 at time t5. In one example, at time t5, Plane 0 can have LP/XP on the buffer for Plane 0 (e.g., Pa SDC). Since Plane 1 is not complete with the read, at time t5, Plane 1 applies read level L6, which completes the read operation for Plane 1. Thus, at time t6, Plane 1 can have UP on the buffer for Plane 1 (e.g., Pb SDC).

In one example, the NAND (e.g., through its internal controller) indicates the status of the fastest plane by asserting VIRT_RDY for all the planes within the plane group via the status register (SR). Once the faster plane of the plane group has completed the data transfer from the storage array (e.g., NAND flash array) to the buffer, the controller can assert VIRT_RDY for plane(s) that have completed page read operation.

As illustrated in diagram 600, the system asserts VIRT_RDY_P_0 at time t5 and asserts VIRT_RDY_P_1 at time t6. Thus, Pa READ RDY occurs at t5, which Pb READ RDY occurs at t6. The read time (tR) for LP/XP, tR_LP/XP, extends from t0 to t5. The read time for UP, tR_UP extends from t0 to t6. It will be observed that the time until RDY=1 is also extends from t0 to t6, because t6 is when both planes of the plane group are ready. It will be observed that the virtual ready signal for Plane 0 occurs sooner than RDY for the plane group. RDY=1 occurs with the longest sense. The ARDY signal is asserted at time t7, which is after the epilogue the occurs after the completion of all read operations.

In one example, the host monitors the VIRT_RDY status of each plane group via an eIMPRO status command (such as CMD_72h described above), which indicates the virtual ready status of the planes of a plane group. In one example, the host monitors the VIRT_RDY status of each plane with a turbo status command (such as CMD_73h described above). Once the device asserts VIRT_RDY for a plane, the host can issue an IMPRO readout operation on the completed planes while the slower planes continue the read operation. It will be understood that the host uses the VIRT_RDY to indicate readiness for data readout, but not for readiness to execute a new command. To queue up the next array operation (such as a subsequent eIMPRO command) on any plane group, the host waits for all planes within the plane group to complete IMPRO operations (e.g., ARDY=1).

Reference in diagram 600 to LP, UP, and XP can indicate a TLC NAND implementation for the illustration. Diagram 600 illustrates the difference between the read of Plane 0 and Plane 1 as DIFF1, between t5 and t6. If Plane 0 was in an SLC mode, it could finish its read at t4, providing an even greater time before Plane 1 is finished, as indicated by DIFF2.

It will be understood that a QLC implementation could have significantly greater time differences between the completion of a read operation of planes in the same plane group. While the TLC is illustrated with the 3 read levels, QLC has more read levels, which could lead to a longer delay between VIRT_RDY_P_0 and VIRT_RDY_P_1. On the other hand, there may be no difference in delay between VIRT_RDY_P_0 and VIRT_RDY_P_1, depending on what values are written to the storage array.

Figure 7:
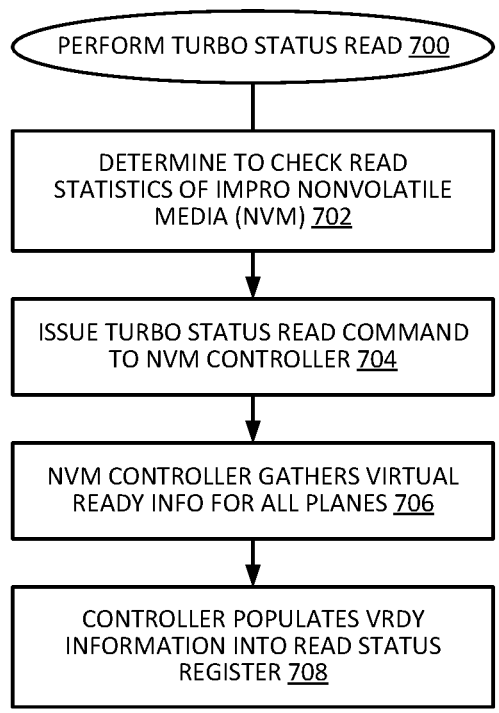
FIG. 7 is a flow diagram of an example of a process for turbo status read.

FIG. 7 is a flow diagram of an example of a process for turbo status read. Process 700 represents a process for performing turbo status read in accordance with any example herein. In one example, the host storage controller determines to check the read statistics of IMPRO nonvolatile media (NVM), at 702. The determination can be part of a polling process where the host polls the storage device after sending a read command.

In one example, the host determines to issue a turbo status read command to the NVM controller, at 704. The NVM controller on the storage device can gather virtual ready information for all planes in response to the turbo status read command, at 706. The NVM controller can populate VRDY information into a read status register, at 708, which the host storage controller can then read to determine ready status.

Figure 8:
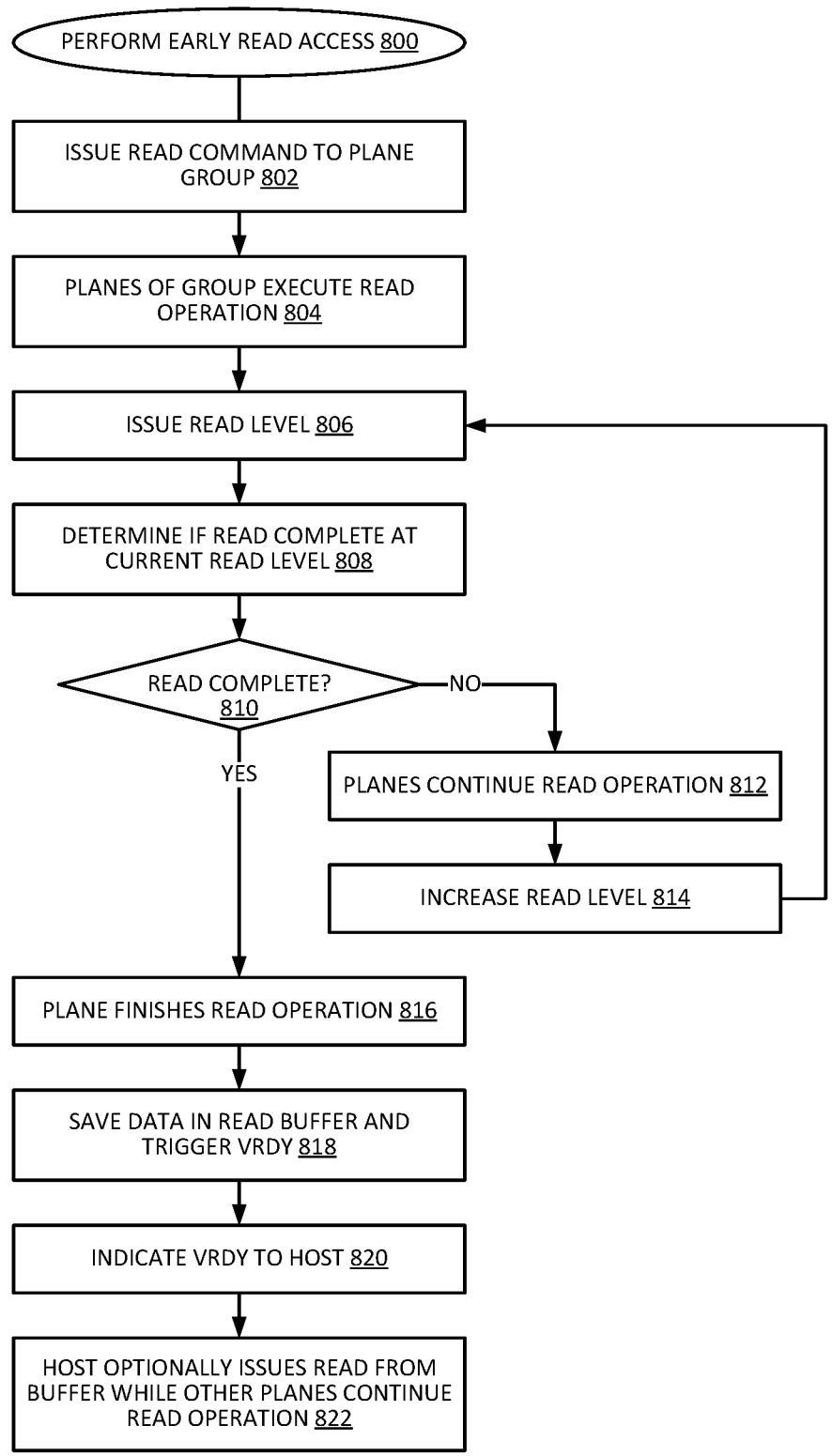
FIG. 8 is a flow diagram of an example of a process for early read access.

FIG. 8 is a flow diagram of an example of a process for early read access. Process 800 represents a processor for performing an early read access of one plane of a plane group that is ready for read prior to another plane of the plane group. The host can issue a read command to a plane group, at 802. The planes of the plane group will execute the read operation, at 804. In an IMPRO system, the planes of the plane group execute the read operation in parallel with each other.

The internal controller on the storage device can issue a first read level, at 806. The controller determines if the read is complete at the current read level, at 808. For any plane that has not completed the read operation at the current read level, at 810 NO branch, the plane(s) that have not finished will continue the read operation, at 812. The controller can increase the read level, at 814, and issue the next read level at 806.

For any plane that has completed the read operation at the current read level, at 810 YES branch, the plane(s) finish the read operation, at 816. The planes save the accessed data in a read buffer and trigger a virtual ready (VRDY) signal, at 818. The controller indicates the VRDY information to the host, at 820. In response to VRDY information, the host can optionally issue a read from the buffer for the plane(s) that are ready, while the other plane(s) continue the read operation, at 822.

Figure 9A:
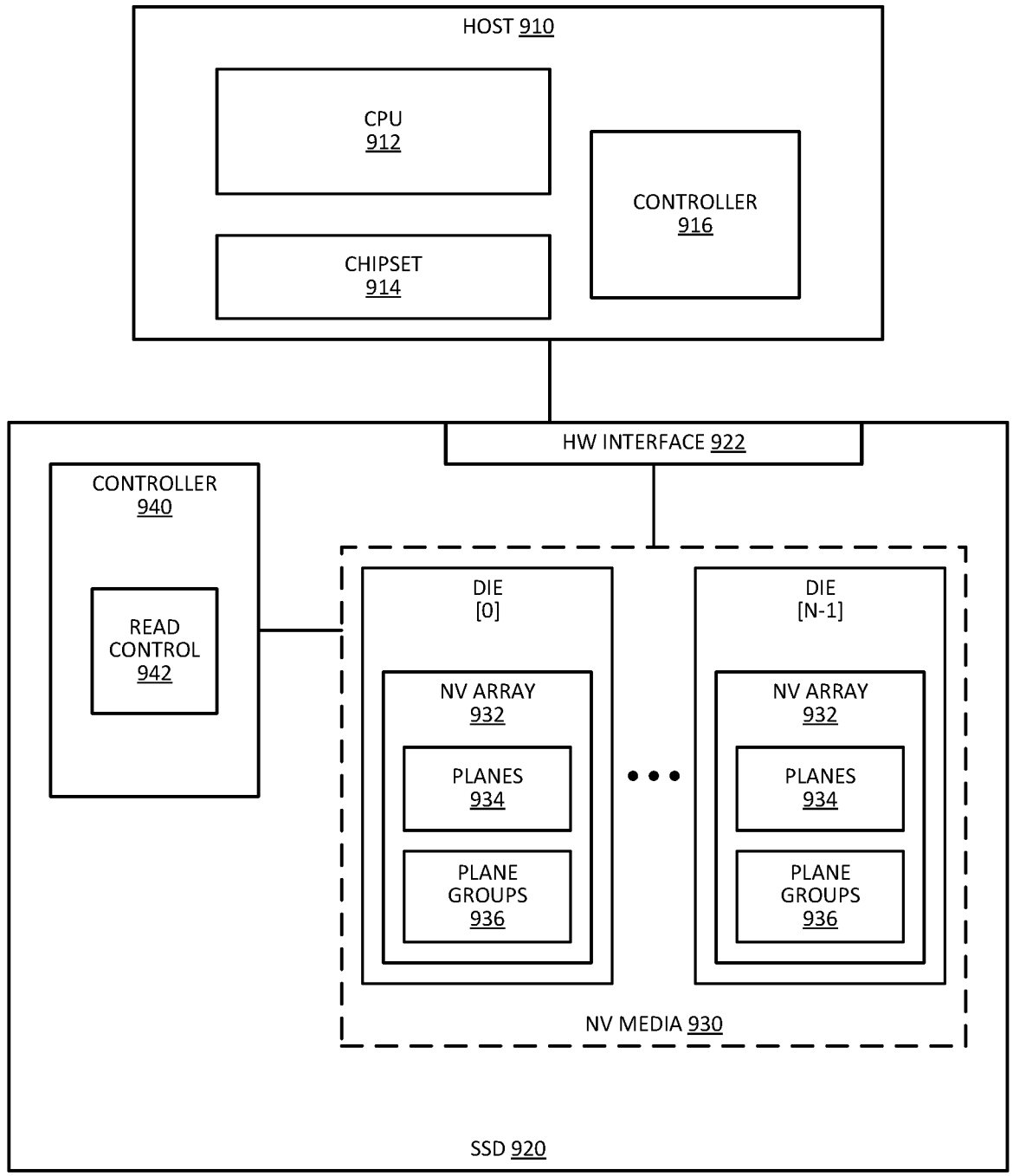
FIG. 9A is a block diagram of an example of a system with a solid state drive (SSD) with planes in plane groups that support express operation.

FIG. 9A is a block diagram of an example of a system with a solid state drive (SSD) with planes in plane groups that support express operation. System 902 represents components of a storage system in accordance with an example of system 100 or system 300. System 902 can be a 3D NAND storage device that supports either turbo status read, or early read access, or both turbo status read and early read access.

System 902 includes SSD 920 coupled with host 910. Host 910 represents a host hardware platform that connects to SSD 920. Host 910 includes CPU (central processing unit) 912 or other processor as a host processor or host processor device. CPU 912 represents any host processor that generates requests to access data stored on SSD 920, either to read the data or to write data to the storage. Such a processor can include a single or multicore processor, a primary processor for a computing device, a graphics processor, a peripheral processor, or a supplemental or auxiliary processor, or a combination. CPU 912 can execute a host OS and other applications to cause the operation of system 902.

Host 910 includes chipset 914, which represents hardware components that can be included in connecting between CPU 912 and SSD 920. For example, chipset 914 can include interconnect circuits and logic to enable access to SSD 920. Thus, host 910 can include a hardware platform drive interconnect to couple SSD 920 to host 910. Host 910 includes hardware to interconnect to the SSD. Likewise, SSD 920 includes corresponding hardware to interconnect to host 910.

Host 910 includes controller 916, which represents a storage controller or memory controller on the host side to control access to SSD 920. In one example, controller 916 is included in chipset 914. In one example, controller 916 is included in CPU 912. Controller 916 can be referred to as an NV memory controller or storage controller to enable host 910 to schedule and organize commands to SSD 920 to read and write data.

SSD 920 represents a solid-state drive or other storage system or module that includes nonvolatile (NV) media 930 to store data. NV media 930 can be, for example, a 3D NAND array. SSD 920 includes HW (hardware) interface 922, which represents hardware components to interface with host 910. For example, HW interface 922 can interface with one or more buses to implement a high speed interface standard such as NVMe (nonvolatile memory express) or PCIe (peripheral component interconnect express).

In one example, NV media 930 is implemented as multiple dies, illustrated as N dies, Die[0:(N−1)]. N can be any number of devices, and is often a binary number. SSD 920 includes controller 940 to control access to NV media 930. Controller 940 represents hardware and control logic within SSD 920 to execute control over the media. Controller 940 is internal to the nonvolatile storage device or module, and is separate from controller 916 of host 910.

The NV dies of NV media 930 include 3D NV array 932, which is a three-dimensional array of storage cells based on the NV media. In one example, NV array 932 includes storage arranged as planes 934 and plane groups 936. Each plane group 936 can have two or more planes 934.

In one example, controller 940 includes read control 942 to implement status and access operations. In one example, read control 942 enables SSD 920 to provide turbo status read information in accordance with any example herein. In one example, read control 942 enables SSD 920 to provide early read access in accordance with any example herein.

Figure 9B:
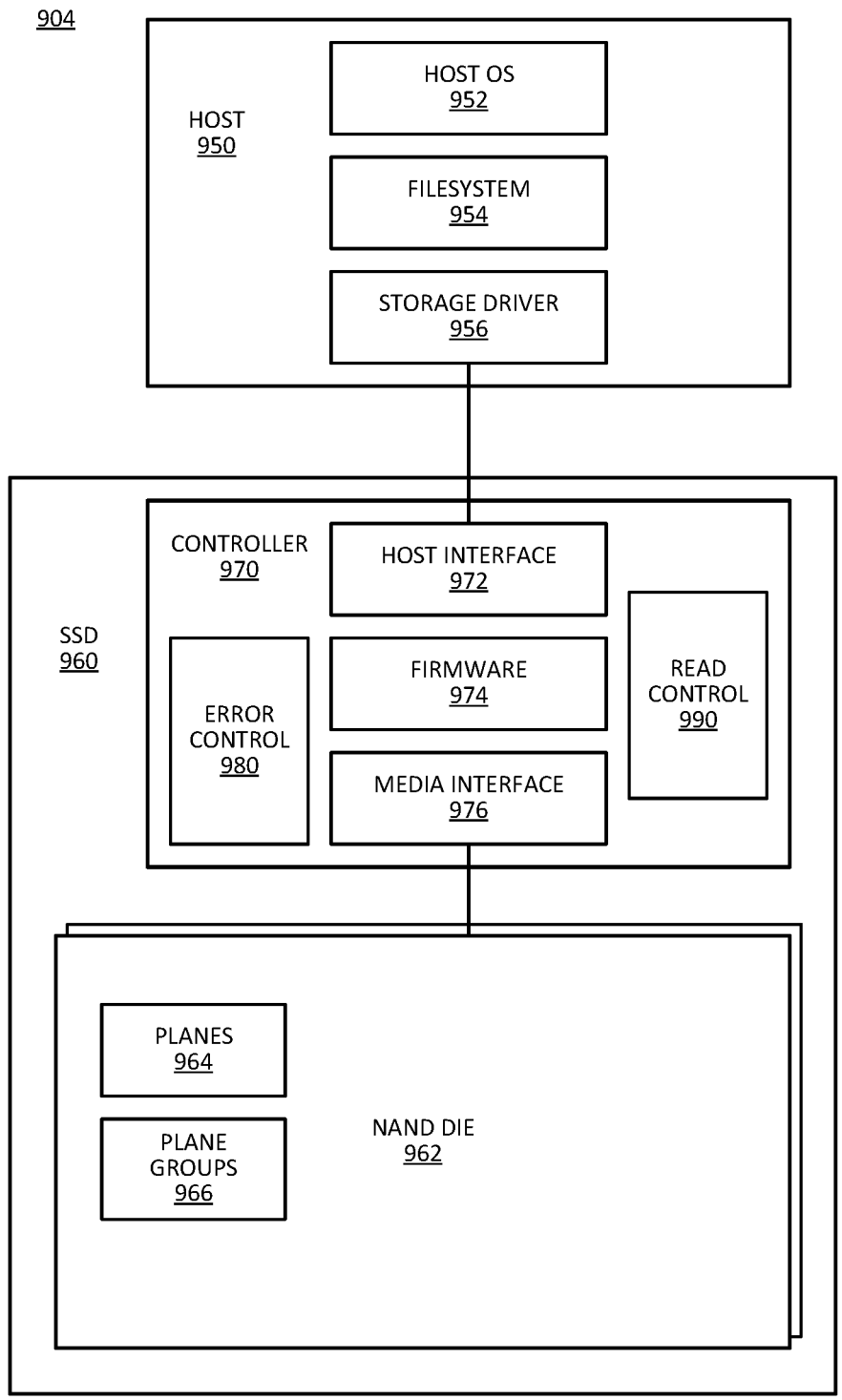
FIG. 9B is a block diagram of an example of a system with a solid state drive (SSD) with a controller to manage express operation for planes in plane groups.

FIG. 9B is a block diagram of an example of a system with a solid state drive (SSD) with a controller to manage express operation for planes in plane groups. System 904 provides one example of a system in accordance with system 902 of FIG. 9A. System 904 illustrates the logical layers of the host and SSD of a hardware platform in accordance with system 902. System 904 can represent software and firmware components of an example of system 902, as well as physical components. In one example, host 950 provides one example of host 910. In one example, SSD 960 provides one example of SSD 920.

In one example, host 950 includes host OS 952, which represents a host operating system or software platform for the host. Host OS 952 can include a platform on which applications, services, agents, and/or other software executes, and is executed by a processor. Filesystem 954 represents control logic for controlling access to the NV media. Filesystem 954 can manage what addresses or memory locations are used to store what data. There are numerous filesystems known, and filesystem 954 can implement known filesystems or other proprietary systems. In one example, filesystem 954 is part of host OS 952.

Storage driver 956 represents one or more system-level modules that control the hardware of host 950. In one example, drivers 956 include a software application to control the interface to SSD 960, and thus control the hardware of SSD 960. Storage driver 956 can provide a communication interface between the host and the SSD.

Controller 970 of SSD 960 includes firmware 974, which represents control software/firmware for the controller. In one example, controller 970 includes host interface 972, which represents an interface to host 950. In one example, controller 970 includes media interface 976, which represents an interface to NAND die 962. NAND die 962 represents a specific example of NV media, and includes an associated 3D NAND array.

Media interface 976 represent control that is executed on hardware of controller 970. It will be understood that controller 970 includes hardware to interface with host 950, which can be considered to be controlled by host interface software/firmware 974. Likewise, it will be understood that controller 970 includes hardware to interface with NAND die 962. In one example, code for host interface 972 can be part of firmware 974. In one example, code for media interface 976 can be part of firmware 974.

In one example, controller 970 includes error control 980 to handle data errors in accessed data, and corner cases in terms of compliance with signaling and communication interfacing. Error control 980 can include implementations in hardware or firmware, or a combination of hardware and software.

In one example, NAND die 962 has plane groups 966 with planes 964. In one example, the planes support IMPRO operation. In one example, controller 970 includes read control 990 to implement status and access operations. In one example, read control 990 enables SSD 960 to provide turbo status read information in accordance with any example herein. In one example, read control 990 enables SSD 960 to provide early read access in accordance with any example herein.

Figure 10:
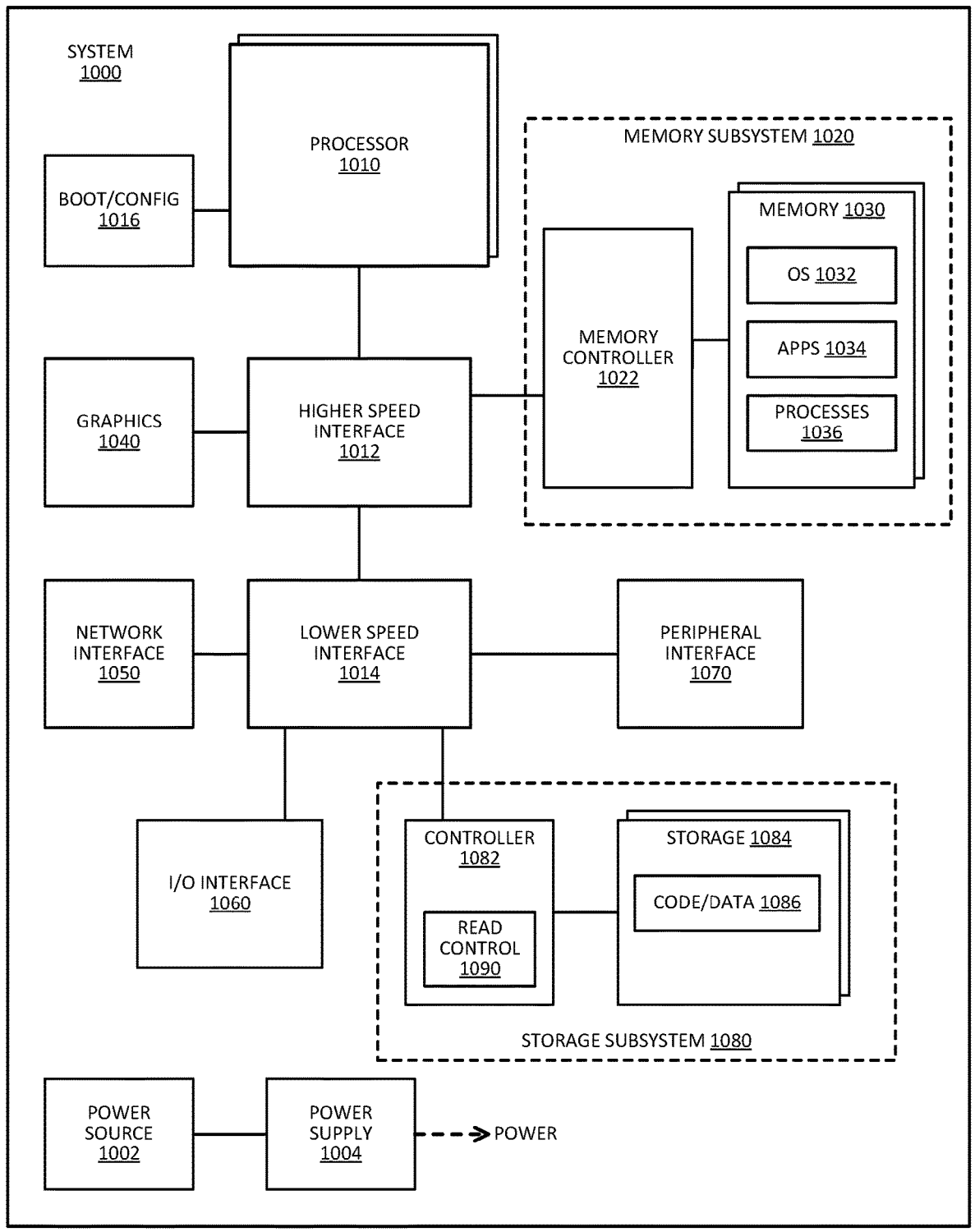
FIG. 10 is a block diagram of an example of a computing system in which express operation with nonvolatile planes in plane groups can be implemented.

FIG. 10 is a block diagram of an example of a computing system in which express operation with nonvolatile planes in plane groups can be implemented. System 1000 represents a computing device in accordance with any example herein, and can be a laptop computer, a desktop computer, a tablet computer, a server, a gaming or entertainment control system, embedded computing device, or other electronic device.

System 1000 represents a system with storage in accordance with an example of system 100 or system 300. In one example, storage 1084 has plane groups with planes. In one example, the planes support IMPRO operation. In one example, controller 1082 includes read control 1090 to implement status and access operations. In one example, read control 1090 enables storage 1084 to provide turbo status read information in accordance with any example herein. In one example, read control 1090 enables storage 1084 to provide early read access in accordance with any example herein.

System 1000 includes processor 1010 can include any type of microprocessor, central processing unit (CPU), graphics processing unit (GPU), processing core, or other processing hardware, or a combination, to provide processing or execution of instructions for system 1000. Processor 1010 can be a host processor device. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or a combination of such devices.

System 1000 includes boot/config 1016, which represents storage to store boot code (e.g., basic input/output system (BIOS)), configuration settings, security hardware (e.g., trusted platform module (TPM)), or other system level hardware that operates outside of a host OS. Boot/config 1016 can include a nonvolatile storage device, such as read-only memory (ROM), flash memory, or other memory devices.

In one example, system 1000 includes interface 1012 coupled to processor 1010, which can represent a higher speed interface or a high throughput interface for system components that need higher bandwidth connections, such as memory subsystem 1020 or graphics interface components 1040. Interface 1012 represents an interface circuit, which can be a standalone component or integrated onto a processor die. Interface 1012 can be integrated as a circuit onto the processor die or integrated as a component on a system on a chip. Where present, graphics interface 1040 interfaces to graphics components for providing a visual display to a user of system 1000. Graphics interface 1040 can be a standalone component or integrated onto the processor die or system on a chip. In one example, graphics interface 1040 can drive a high definition (HD) display or ultra high definition (UHD) display that provides an output to a user. In one example, the display can include a touchscreen display. In one example, graphics interface 1040 generates a display based on data stored in memory 1030 or based on operations executed by processor 1010 or both.

Memory subsystem 1020 represents the main memory of system 1000, and provides storage for code to be executed by processor 1010, or data values to be used in executing a routine. Memory subsystem 1020 can include one or more varieties of random-access memory (RAM) such as DRAM, 3DXP (three-dimensional crosspoint), or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010, such as integrated onto the processor die or a system on a chip.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 1000 includes interface 1014, which can be coupled to interface 1012. Interface 1014 can be a lower speed interface than interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can exchange data with a remote device, which can include sending data stored in memory or receiving data to be stored in memory.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, NAND, 3DXP, or optical based disks, or a combination. Storage 1084 holds code or instructions and data 1086 in a persistent state (i.e., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (i.e., the value or state of the data is indeterminate if power is interrupted to system 1000). In one example, storage subsystem 1080 includes controller 1082 to interface with storage 1084. In one example controller 1082 is a physical part of interface 1014 or processor 1010, or can include circuits or logic in both processor 1010 and interface 1014.

Power source 1002 provides power to the components of system 1000. More specifically, power source 1002 typically interfaces to one or multiple power supplies 1004 in system 1000 to provide power to the components of system 1000. In one example, power supply 1004 includes an AC to DC (alternating current to direct current) adapter to plug into a wall outlet. Such AC power can be renewable energy (e.g., solar power) power source 1002. In one example, power source 1002 includes a DC power source, such as an external AC to DC converter. In one example, power source 1002 or power supply 1004 includes wireless charging hardware to charge via proximity to a charging field. In one example, power source 1002 can include an internal battery or fuel cell source.

Figure 11:
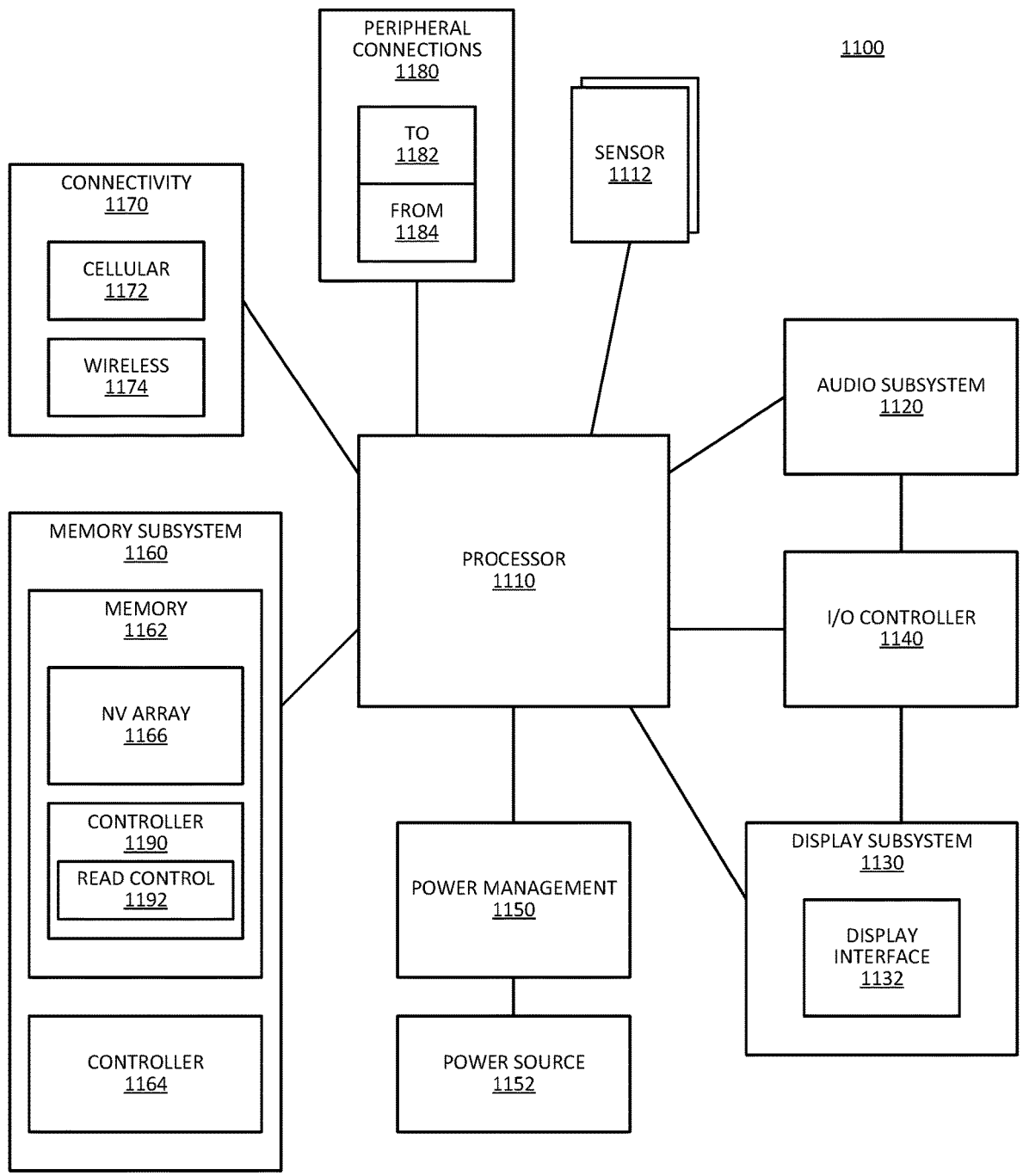
FIG. 11 is a block diagram of an example of a mobile device in which express operation with nonvolatile planes in plane groups can be implemented.

FIG. 11 is a block diagram of an example of a mobile device in which express operation with nonvolatile planes in plane groups can be implemented. System 1100 represents a mobile computing device, such as a computing tablet, a mobile phone or smartphone, wearable computing device, or other mobile device, or an embedded computing device. It will be understood that certain of the components are shown generally, and not all components of such a device are shown in system 1100.

System 1100 represents a system with storage in accordance with an example of system 100 or system 300. In one example, memory 1162 includes NV array 1166, which can include a nonvolatile memory with plane groups with planes. In one example, the planes support IMPRO operation. Controller 1190 represents an internal controller in a storage device. In one example, controller 1190 includes read control 1192 to implement status and access operations. In one example, read control 1192 enables memory 1162 to provide turbo status read information for nonvolatile storage in accordance with any example herein. In one example, read control 1192 enables memory 1162 to provide early read access for nonvolatile storage in accordance with any example herein.

System 1100 includes processor 1110, which performs the primary processing operations of system 1100. Processor 1110 can be a host processor device. Processor 1110 can include one or more physical devices, such as microprocessors, application processors, microcontrollers, programmable logic devices, or other processing means. The processing operations performed by processor 1110 include the execution of an operating platform or operating system on which applications and device functions are executed. The processing operations include operations related to I/O (input/output) with a human user or with other devices, operations related to power management, operations related to connecting system 1100 to another device, or a combination. The processing operations can also include operations related to audio I/O, display I/O, or other interfacing, or a combination. Processor 1110 can execute data stored in memory. Processor 1110 can write or edit data stored in memory.

In one example, system 1100 includes one or more sensors 1112. Sensors 1112 represent embedded sensors or interfaces to external sensors, or a combination. Sensors 1112 enable system 1100 to monitor or detect one or more conditions of an environment or a device in which system 1100 is implemented. Sensors 1112 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1112 can also include sensors for biometric systems such as fingerprint recognition systems, face detection or recognition systems, or other systems that detect or recognize user features. Sensors 1112 should be understood broadly, and not limiting on the many different types of sensors that could be implemented with system 1100. In one example, one or more sensors 1112 couples to processor 1110 via a frontend circuit integrated with processor 1110. In one example, one or more sensors 1112 couples to processor 1110 via another component of system 1100.

In one example, system 1100 includes audio subsystem 1120, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into system 1100, or connected to system 1100. In one example, a user interacts with system 1100 by providing audio commands that are received and processed by processor 1110.

Display subsystem 1130 represents hardware (e.g., display devices) and software components (e.g., drivers) that provide a visual display for presentation to a user. In one example, the display includes tactile components or touchscreen elements for a user to interact with the computing device. Display subsystem 1130 includes display interface 1132, which includes the particular screen or hardware device used to provide a display to a user. In one example, display interface 1132 includes logic separate from processor 1110 (such as a graphics processor) to perform at least some processing related to the display. In one example, display subsystem 1130 includes a touchscreen device that provides both output and input to a user. In one example, display subsystem 1130 includes a high definition (HD) or ultra-high definition (UHD) display that provides an output to a user. In one example, display subsystem includes or drives a touchscreen display. In one example, display subsystem 1130 generates display information based on data stored in memory or based on operations executed by processor 1110 or both.

I/O controller 1140 represents hardware devices and software components related to interaction with a user. I/O controller 1140 can operate to manage hardware that is part of audio subsystem 1120, or display subsystem 1130, or both. Additionally, I/O controller 1140 illustrates a connection point for additional devices that connect to system 1100 through which a user might interact with the system. For example, devices that can be attached to system 1100 might include microphone devices, speaker or stereo systems, video systems or other display device, keyboard or keypad devices, buttons/switches, or other I/O devices for use with specific applications such as card readers or other devices.

As mentioned above, I/O controller 1140 can interact with audio subsystem 1120 or display subsystem 1130 or both. For example, input through a microphone or other audio device can provide input or commands for one or more applications or functions of system 1100. Additionally, audio output can be provided instead of or in addition to display output. In another example, if display subsystem includes a touchscreen, the display device also acts as an input device, which can be at least partially managed by I/O controller 1140. There can also be additional buttons or switches on system 1100 to provide I/O functions managed by I/O controller 1140.

In one example, I/O controller 1140 manages devices such as accelerometers, cameras, light sensors or other environmental sensors, gyroscopes, global positioning system (GPS), or other hardware that can be included in system 1100, or sensors 1112. The input can be part of direct user interaction, as well as providing environmental input to the system to influence its operations (such as filtering for noise, adjusting displays for brightness detection, applying a flash for a camera, or other features).

In one example, system 1100 includes power management 1150 that manages battery power usage, charging of the battery, and features related to power saving operation. Power management 1150 manages power from power source 1152, which provides power to the components of system 1100. In one example, power source 1152 includes an AC to DC (alternating current to direct current) adapter to plug into a wall outlet. Such AC power can be renewable energy (e.g., solar power, motion based power). In one example, power source 1152 includes only DC power, which can be provided by a DC power source, such as an external AC to DC converter. In one example, power source 1152 includes wireless charging hardware to charge via proximity to a charging field. In one example, power source 1152 can include an internal battery or fuel cell source.

Memory subsystem 1160 includes memory device(s) 1162 for storing information in system 1100. Memory subsystem 1160 can include nonvolatile (state does not change if power to the memory device is interrupted) or volatile (state is indeterminate if power to the memory device is interrupted) memory devices, or a combination. Memory 1160 can store application data, user data, music, photos, documents, or other data, as well as system data (whether long-term or temporary) related to the execution of the applications and functions of system 1100. In one example, memory subsystem 1160 includes memory controller 1164 (which could also be considered part of the control of system 1100, and could potentially be considered part of processor 1110). Memory controller 1164 includes a scheduler to generate and issue commands to control access to memory device 1162.

Connectivity 1170 includes hardware devices (e.g., wireless or wired connectors and communication hardware, or a combination of wired and wireless hardware) and software components (e.g., drivers, protocol stacks) to enable system 1100 to communicate with external devices. The external device could be separate devices, such as other computing devices, wireless access points or base stations, as well as peripherals such as headsets, printers, or other devices. In one example, system 1100 exchanges data with an external device for storage in memory or for display on a display device. The exchanged data can include data to be stored in memory, or data already stored in memory, to read, write, or edit data.

Connectivity 1170 can include multiple different types of connectivity. To generalize, system 1100 is illustrated with cellular connectivity 1172 and wireless connectivity 1174. Cellular connectivity 1172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), 5G, or other cellular service standards. Wireless connectivity 1174 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1180 include hardware interfaces and connectors, as well as software components (e.g., drivers, protocol stacks) to make peripheral connections. It will be understood that system 1100 could both be a peripheral device ("to" 1182) to other computing devices, as well as have peripheral devices ("from" 1184) connected to it. System 1100 commonly has a "docking" connector to connect to other computing devices for purposes such as managing (e.g., downloading, uploading, changing, synchronizing) content on system 1100. Additionally, a docking connector can allow system 1100 to connect to certain peripherals that allow system 1100 to control content output, for example, to audiovisual or other systems.

In addition to a proprietary docking connector or other proprietary connection hardware, system 1100 can make peripheral connections 1180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

Figure 12:
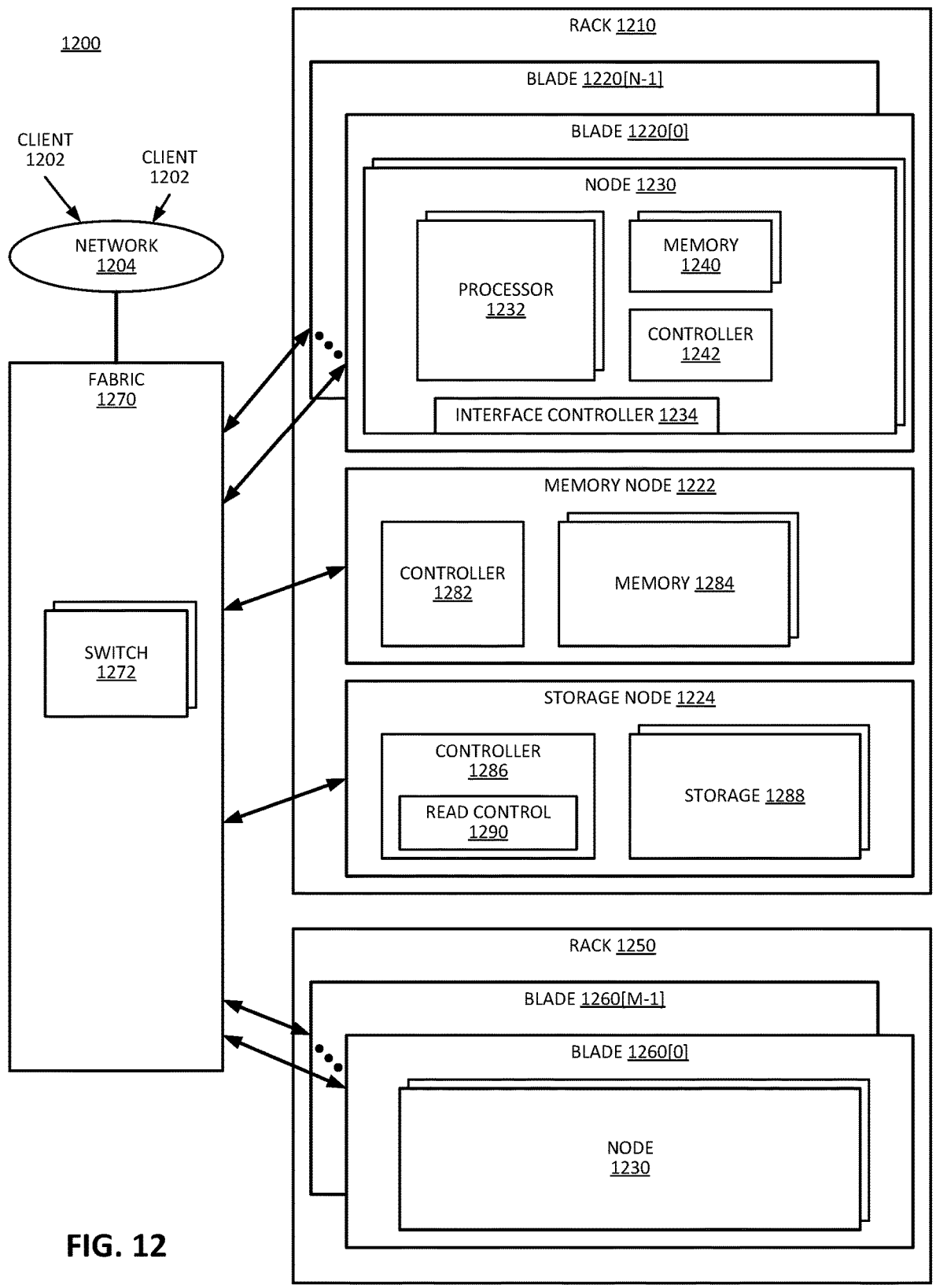
FIG. 12 is a block diagram of an example of a multi-node network in which express operation with nonvolatile planes in plane groups can be implemented.

FIG. 12 is a block diagram of an example of a multi-node network in which express operation with nonvolatile planes in plane groups can be implemented. System 1200 represents a network of nodes that can apply adaptive ECC. In one example, system 1200 represents a data center. In one example, system 1200 represents a server farm. In one example, system 1200 represents a data cloud or a processing cloud.

System 1200 represents a system with storage in accordance with an example of system 100 or system 300. In one example, storage node 1224 storage 1288, which can include a nonvolatile memory with plane groups with planes. In one example, the planes support IMPRO operation. Controller 1286 represents an internal controller in a storage device. In one example, controller 1286 includes read control 1290 to implement status and access operations. In one example, read control 1290 enables storage 1288 to provide turbo status read information for nonvolatile storage in accordance with any example herein. In one example, read control 1290 enables storage 1288 to provide early read access for nonvolatile storage in accordance with any example herein.

One or more clients 1202 make requests over network 1204 to system 1200. Network 1204 represents one or more local networks, or wide area networks, or a combination. Clients 1202 can be human or machine clients, which generate requests for the execution of operations by system 1200. System 1200 executes applications or data computation tasks requested by clients 1202.

In one example, system 1200 includes one or more racks, which represent structural and interconnect resources to house and interconnect multiple computation nodes. In one example, rack 1210 includes multiple nodes 1230. In one example, rack 1210 hosts multiple blade components, blade 1220[0], . . . , blade 1220[N−1], collectively blades 1220. Hosting refers to providing power, structural or mechanical support, and interconnection. Blades 1220 can refer to computing resources on printed circuit boards (PCBs), where a PCB houses the hardware components for one or more nodes 1230. In one example, blades 1220 do not include a chassis or housing or other "box" other than that provided by rack 1210. In one example, blades 1220 include housing with exposed connector to connect into rack 1210. In one example, system 1200 does not include rack 1210, and each blade 1220 includes a chassis or housing that can stack or otherwise reside in close proximity to other blades and allow interconnection of nodes 1230.

System 1200 includes fabric 1270, which represents one or more interconnectors for nodes 1230. In one example, fabric 1270 includes multiple switches 1272 or routers or other hardware to route signals among nodes 1230. Additionally, fabric 1270 can couple system 1200 to network 1204 for access by clients 1202. In addition to routing equipment, fabric 1270 can be considered to include the cables or ports or other hardware equipment to couple nodes 1230 together. In one example, fabric 1270 has one or more associated protocols to manage the routing of signals through system 1200. In one example, the protocol or protocols is at least partly dependent on the hardware equipment used in system 1200.

As illustrated, rack 1210 includes N blades 1220. In one example, in addition to rack 1210, system 1200 includes rack 1250. As illustrated, rack 1250 includes M blade components, blade 1260[0], . . . , blade 1260[M−1], collectively blades 1260. M is not necessarily the same as N; thus, it will be understood that various different hardware equipment components could be used, and coupled together into system 1200 over fabric 1270. Blades 1260 can be the same or similar to blades 1220. Nodes 1230 can be any type of node and are not necessarily all the same type of node. System 1200 is not limited to being homogenous, nor is it limited to not being homogenous.

The nodes in system 1200 can include compute nodes, memory nodes, storage nodes, accelerator nodes, or other nodes. Rack 1210 is represented with memory node 1222 and storage node 1224, which represent shared system memory resources, and shared persistent storage, respectively. One or more nodes of rack 1250 can be a memory node or a storage node.

Nodes 1230 represent examples of compute nodes. For simplicity, only the compute node in blade 1220[0] is illustrated in detail. However, other nodes in system 1200 can be the same or similar. At least some nodes 1230 are computation nodes, with processor (proc) 1232 and memory 1240. A computation node refers to a node with processing resources (e.g., one or more processors) that executes an operating system and can receive and process one or more tasks. In one example, at least some nodes 1230 are server nodes with a server as processing resources represented by processor 1232 and memory 1240.

Memory node 1222 represents an example of a memory node, with system memory external to the compute nodes. Memory nodes can include controller 1282, which represents a processor on the node to manage access to the memory. The memory nodes include memory 1284 as memory resources to be shared among multiple compute nodes.

Storage node 1224 represents an example of a storage server, which refers to a node with more storage resources than a computation node, and rather than having processors for the execution of tasks, a storage server includes processing resources to manage access to the storage nodes within the storage server. Storage nodes can include controller 1286 to manage access to the storage 1288 of the storage node.

In one example, node 1230 includes interface controller 1234, which represents logic to control access by node 1230 to fabric 1270. The logic can include hardware resources to interconnect to the physical interconnection hardware. The logic can include software or firmware logic to manage the interconnection. In one example, interface controller 1234 is or includes a host fabric interface, which can be a fabric interface in accordance with any example described herein. The interface controllers for memory node 1222 and storage node 1224 are not explicitly shown.

Processor 1232 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 1240 can be or include memory devices represented by memory 1240 and a memory controller represented by controller 1242.

In general with respect to the descriptions herein, in one aspect, a first storage device includes: a storage array with multiple planes having independent multiplane read operation (IMPRO), the multiple planes organized as plane groups, with planes of a plane group to receive and process commands in parallel; and a storage controller to receive a command from a host controller, and in response to receipt of the command, provide ready information for all planes to the host controller.

In accordance with an example of the first storage device, the ready information comprises virtual ready information to indicate at least one of the planes of the plane group is ready to read. In accordance with any preceding example of the first storage device, in one example, the storage controller is to update ready status for a plane in response to completion of a read operation by the plane. In accordance with any preceding example of the first storage device, in one example, the multiple planes include planes of different plane types, including single level cell (SLC) and multilevel cell (MLC). In accordance with any preceding example of the first storage device, in one example, the multiple planes include at least one plane with an on-the-fly SLC mode. In accordance with any preceding example of the first storage device, in one example, the storage controller is to write virtual ready status information to a status register. In accordance with any preceding example of the first storage device, in one example, the storage controller is to further write thermal alert information to the status register with the virtual ready status information. In accordance with any preceding example of the first storage device, in one example, the storage controller is to further write power reset information to the status register with the virtual ready status information.

In general with respect to the descriptions herein, in one aspect, a first computer system includes: a host controller; and a storage device including: a three-dimensional (3D) NAND die with a storage array having multiple planes having independent multiplane read operation (IMPRO), the multiple planes organized as plane groups, with planes of a plane group to receive and process commands in parallel; and a storage controller to receive a command from the host controller, and in response to receipt of the command, provide ready information for all planes to the host controller.

In accordance with an example of the first computer system, the ready information comprises virtual ready information to indicate at least one of the planes of the plane group is ready to read. In accordance with any preceding example of the first computer system, in one example, the storage controller is to update ready status for a plane in response to completion of a read operation by the plane. In accordance with any preceding example of the first computer system, in one example, the multiple planes include planes of different plane types, including single level cell (SLC) and multilevel cell (MLC). In accordance with any preceding example of the first computer system, in one example, the storage controller is to write virtual ready status information to a status register as well as thermal alert information and write power information to the status register. In accordance with any preceding example of the first computer system, in one example, the computer system includes one or more of: a multicore processor; a display communicatively coupled to a processor; a network interface communicatively coupled to a processor; or a battery to power the computer system.

In general with respect to the descriptions herein, in one aspect, a second storage device includes: a storage array with multiple planes organized as plane groups, with planes of a plane group to receive and process commands in parallel, each plane group having a first plane and a second plane; and a storage controller to read data from the first plane of a plane group in response to a virtual ready signal for the first plane, before the second plane of the plane group is ready.

In accordance with an example of the second storage device, the first plane and the second plane are to process a read operation, wherein the first plane is to signal the virtual ready after completion of the read operation with fewer read levels than the second plane. In accordance with any preceding example of the second storage device, in one example, the second plane is to continue the read operation after the first plane completes the read operation. In accordance with any preceding example of the second storage device, in one example, the multiple planes have independent multiplane read operation (IMPRO). In accordance with any preceding example of the second storage device, in one example, the storage array has two planes per plane group. In accordance with any preceding example of the second storage device, in one example, the second storage device includes: a buffer to store the read data from the first plane prior to providing the read data from the storage device to a host device.

In general with respect to the descriptions herein, in one aspect, a first storage controller includes: input/output (I/O) hardware to couple to a storage device with multiple planes having independent multiplane read operation (IMPRO), the multiple planes organized as plane groups, with planes of a plane group to receive and process commands in parallel; and read control to send a command to request ready information for all planes.

In accordance with an example of the first storage controller, the ready information comprises virtual ready information to indicate at least one of the planes of the plane group is ready to read. In accordance with any preceding example of the first storage controller, in one example, the storage device includes a register to be updated with ready status for a plane in response to completion of a read operation by the plane. In accordance with any preceding example of the first storage controller, in one example, the register comprises a status register. In accordance with any preceding example of the first storage controller, in one example, the status register is to further store thermal alert information with the virtual ready status information. In accordance with any preceding example of the first storage controller, in one example, the status register is to further store write power reset information with the virtual ready status information. In accordance with any preceding example of the first storage controller, in one example, the multiple planes include planes of different plane types, including single level cell (SLC) and multilevel cell (MLC). In accordance with any preceding example of the first storage controller, in one example, the multiple planes include at least one plane with an on-the-fly SLC mode.

In general with respect to the descriptions herein, in one aspect, a first method includes: sending a command from a host controller to a storage device, the storage device having multiple planes with independent multiplane read operation (IMPRO), the multiple planes organized as plane groups, with planes of a plane group to receive and process commands in parallel; and receiving ready information from the storage device for all planes.

In accordance with an example of the first method, the ready information comprises virtual ready information to indicate at least one of the planes of the plane group is ready to read. In accordance with any preceding example of the first method, in one example, the first method further includes the storage device updating ready status for a plane in response to completion of a read operation by the plane. In accordance with any preceding example of the first method, in one example, the multiple planes include planes of different plane types, including single level cell (SLC) and multilevel cell (MLC). In accordance with any preceding example of the first method, in one example, the multiple planes include at least one plane with an on-the-fly SLC mode. In accordance with any preceding example of the first method, in one example, the storage device writes virtual ready status information to a status register. In accordance with any preceding example of the first method, in one example, the storage device writes thermal alert information to the status register with the virtual ready status information. In accordance with any preceding example of the first method, in one example, the storage device writes power reset information to the status register with the virtual ready status information.

In general with respect to the descriptions herein, in one aspect, a second method includes: receiving a command from at a storage device from a host controller, the storage device having multiple planes with independent multiplane read operation (IMPRO), the multiple planes organized as plane groups, with planes of a plane group to receive and process commands in parallel; and sending ready information to the host controller for all planes.

In accordance with an example of the second method, the ready information comprises virtual ready information to indicate at least one of the planes of the plane group is ready to read. In accordance with any preceding example of the second method, in one example, the second method further includes the storage device updating ready status for a plane in response to completion of a read operation by the plane. In accordance with any preceding example of the second method, in one example, the multiple planes include planes of different plane types, including single level cell (SLC) and multilevel cell (MLC). In accordance with any preceding example of the second method, in one example, the multiple planes include at least one plane with an on-the-fly SLC mode. In accordance with any preceding example of the second method, in one example, the storage device writes virtual ready status information to a status register. In accordance with any preceding example of the second method, in one example, the storage device writes thermal alert information to the status register with the virtual ready status information. In accordance with any preceding example of the second method, in one example, the storage device writes power reset information to the status register with the virtual ready status information.

In general with respect to the descriptions herein, in one aspect, a second computer system includes: a host controller; and a storage device including: a three-dimensional (3D) NAND die in accordance with any preceding example of the second storage device.

In general with respect to the descriptions herein, in one aspect, a third storage device includes: a storage array with multiple planes organized as plane groups, with planes of a plane group to receive and process commands in parallel, each plane group having a first plane and a second plane; and a storage controller to read data from the first plane of a plane group in response to a virtual ready signal for the first plane, before the second plane of the plane group is ready.

In accordance with an example of the third storage device, the first plane and the second plane are to process a read operation, wherein the first plane is to signal the virtual ready after completion of the read operation with fewer read levels than the second plane. In accordance with any preceding example of the third storage device, in one example, the second plane is to continue the read operation after the first plane completes the read operation. In accordance with any preceding example of the third storage device, in one example, the multiple planes have independent multiplane read operation (IMPRO). In accordance with any preceding example of the third storage device, in one example, the storage array has two planes per plane group. In accordance with any preceding example of the third storage device, in one example, the storage device including a buffer to store the read data from the first plane prior to providing the read data from the storage device to a host device. In general with respect to the descriptions herein, in one aspect, a second computer system includes: a host controller; and a storage device including: a three-dimensional (3D) NAND die in accordance with any preceding example of the third storage device.

In general with respect to the descriptions herein, in one aspect, a second storage controller includes: input/output (I/O) hardware to couple to a storage device with multiple planes organized as plane groups, with planes of a plane group to receive and process commands in parallel, each plane group having a first plane and a second plane; and read control to send a command to read data from the first plane of a plane group in response to a virtual ready signal for the first plane, before the second plane of the plane group is ready.

In accordance with an example of the second storage controller, the first plane and the second plane are to process a read operation, wherein the first plane is to signal the virtual ready after completion of the read operation with fewer read levels than the second plane. In accordance with any preceding example of the second storage controller, in one example, the second plane is to continue the read operation after the first plane completes the read operation. In accordance with any preceding example of the second storage controller, in one example, the multiple planes have independent multiplane read operation (IMPRO). In accordance with any preceding example of the second storage controller, in one example, the storage array has two planes per plane group. In accordance with any preceding example of the second storage controller, in one example, the storage device includes a buffer to store the read data from the first plane prior to providing the read data from the storage device to a host device.

In general with respect to the descriptions herein, in one aspect, a second computer system includes: a host controller in accordance with any preceding example of the second storage controller; and a storage device including: a three-dimensional (3D) NAND die.

In general with respect to the descriptions herein, in one aspect, a third method includes: receiving a command at a storage array with multiple planes organized as plane groups, with planes of a plane group to receive and process commands in parallel, each plane group having a first plane and a second plane, the command to read data from the first plane of a plane group in response to a virtual ready signal for the first plane; and sending the data to a host controller before the second plane of the plane group is ready.

In accordance with an example of the third method, the first plane and the second plane are to process a read operation, wherein the first plane is to signal the virtual ready after completion of the read operation with fewer read levels than the second plane.

In accordance with any preceding example of the third method, in one example, the second plane is to continue the read operation after the first plane completes the read operation. In accordance with any preceding example of the third method, in one example, the multiple planes have independent multiplane read operation (IMPRO). In accordance with any preceding example of the third method, in one example, the storage array has two planes per plane group. In accordance with any preceding example of the third method, in one example, the method includes storing the read data from the first plane prior to providing the read data from the storage device to a host device.

In general with respect to the descriptions herein, in one aspect, a fourth method includes: sending a command from a host controller to a storage device having a storage array with multiple planes organized as plane groups, with planes of a plane group to receive and process commands in parallel, each plane group having a first plane and a second plane, the command to read data from the first plane of a plane group in response to a virtual ready signal for the first plane; and receiving the data at the host controller before the second plane of the plane group is ready.

In accordance with an example of the fourth method, the first plane and the second plane are to process a read operation, wherein the first plane is to signal the virtual ready after completion of the read operation with fewer read levels than the second plane. In accordance with any preceding example of the fourth method, in one example, the second plane is to continue the read operation after the first plane completes the read operation. In accordance with any preceding example of the fourth method, in one example, the multiple planes have independent multiplane read operation (IMPRO). In accordance with any preceding example of the fourth method, in one example, the storage array has two planes per plane group. In accordance with any preceding example of the fourth method, in one example, the method includes storing the read data from the first plane prior to providing the read data from the storage device to a host device.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A storage device, comprising:
a storage die having a storage array and including a plurality of planes having independent multiplane read operation (IMPRO), wherein the plurality of planes are organized as a plurality of plane groups including a first plane group, and each of the plurality of plane groups includes a set of respective planes that is configured to receive and process commands in parallel, and wherein the set of respective planes of the first plane group is configured to process at least a first command in parallel; and
a storage controller to receive a single status command from a host controller, and in response to receipt of the single status command, provide ready information for the plurality of planes of the plurality of plane groups of the storage die to the host controller.

2. The storage device of claim 1, wherein the ready information comprises virtual ready information to indicate at least one of the set of respective planes of the first plane group is ready to read.

3. The storage device of claim 1, wherein the storage controller is to update ready status for a first plane in response to completion of a read operation by the first plane.

4. The storage device of claim 1, wherein the plurality of planes include planes of different plane types, including single level cell (SLC) and multilevel cell (MLC).

5. The storage device of claim 3, wherein the plurality of planes include at least one plane with an on-the-fly SLC mode.

6. The storage device of claim 1, wherein the storage controller is to write virtual ready status information to a status register.

7. The storage device of claim 6, wherein the storage controller is to further write thermal alert information to the status register with the virtual ready status information.

8. The storage device of claim 6, wherein the storage controller is to further write power reset information to the status register with the virtual ready status information.

9. A computer system comprising:
a host controller; and
a storage device including:
a three-dimensional (3D) NAND die with a storage array having a plurality of planes having independent multiplane read operation (IMPRO), wherein the plurality of planes are organized as a plurality of plane groups including a first plane group, and each of the plurality of plane groups includes a set of respective planes that is configured to receive and process commands in parallel, and wherein the set of respective planes of the first plane group of the plurality of plane groups is configured to process at least a first command in parallel; and
a storage controller to receive a single status command from a host controller, and in response to receipt of the single status command, provide ready information for the plurality of planes of the plurality of plane groups of the 3D NAND die to the host controller.

10. The computer system of claim 9, wherein the ready information comprises virtual ready information to indicate at least one of the set of respective planes of the first plane group is ready to read.

11. The computer system of claim 9, wherein the storage controller is to update ready status for a first plane in response to completion of a read operation by the first plane.

12. The computer system of claim 9, wherein the plurality of planes include planes of different plane types, including single level cell (SLC) and multilevel cell (MLC).

13. The computer system of claim 9, wherein the storage controller is to write virtual ready status information to a status register as well as thermal alert information and write power information to the status register.

14. The computer system of claim 9, further comprising one or more of:
a multicore processor;
a display communicatively coupled to a processor;
a network interface communicatively coupled to a processor; or
a battery to power the computer system.

15. A method for status read comprising:
sending a single status command from a host controller to a storage device, the storage device having a plurality of planes with independent multiplane read operation (IMPRO), wherein the plurality of planes are organized as a plurality of plane groups including a first plane group, and each of the plurality of plane groups includes a set of respective planes that is configured to receive and process commands in parallel, and wherein the set of respective planes of the first plane group of the plurality of plane groups is configured to process at least a first command in parallel; and
in response to the single status command, receiving ready information for the plurality of planes of the plurality of plane groups of the storage device.

16. The method of claim 15, wherein the ready information comprises virtual ready information to indicate at least one of the set of respective planes of the first plane group is ready to read.

17. The method of claim 15, wherein the plurality of planes include planes of different plane types, including single level cell (SLC) and multilevel cell (MLC).

18. The method of claim 15, wherein receiving the ready information comprises reading a status register in which the storage device is to write virtual ready status information.

19. The method of claim 18, wherein the storage device is to write the virtual ready status information for a first plane in response to completion of a read operation by the first plane.

20. The method of claim 18, wherein reading the status register comprises reading either thermal alert information or power reset information or both thermal alert information and power reset information from the status register with the virtual ready status information.

* * * * *